United States Patent
Kim et al.

(10) Patent No.: US 11,720,117 B1
(45) Date of Patent: Aug. 8, 2023

(54) SYSTEM TO FACILITATE AUTONOMOUS MOBILE DEVICE MOVEMENT

(71) Applicant: AMAZON TECHNOLOGIES, INC., Seattle, WA (US)

(72) Inventors: Chang Young Kim, Newark, CA (US); Shashikanth Sreenivasaiah, Sunnyvale, CA (US); Stephen Phillips, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 178 days.

(21) Appl. No.: 17/082,988

(22) Filed: Oct. 28, 2020

(51) Int. Cl.
G05D 1/02 (2020.01)

(52) U.S. Cl.
CPC ......... *G05D 1/0238* (2013.01); *G05D 1/0212* (2013.01); *G05D 1/0274* (2013.01); *G05D 2201/0207* (2013.01)

(58) Field of Classification Search
CPC ...... G01C 21/32; G01C 21/30; G01C 21/005; G01C 21/3602; G01C 21/165; G01C 21/3635; G01C 21/28; G01C 21/20; G01C 21/3644; G05D 1/0274; G05D 1/0214; G05D 2201/0213; G05D 1/0231; G05D 1/0223; G05D 1/0088; G05D 1/0234; G05D 1/0253; G05D 1/0257; G05D 1/0278; G05D 1/0238; G05D 1/0212; G05D 2201/0207; G06T 7/70; G06T 2207/30252; G06T 2207/30244; G06T 7/20; G06T 2207/10016; G01S 17/89; G01S 13/931; G01S 17/931; G06K 9/6215; G06K 9/6217; G06V 20/56
See application file for complete search history.

(56) References Cited

U.S. PATENT DOCUMENTS 9,870,624 B1 * 1/2018 Narang ............... G06T 7/74
10,111,069 B1 * 10/2018 Dawson-Haggerty .................. H04W 4/20

(Continued)

OTHER PUBLICATIONS

Samuel Irving, Human-Assisted Machine Learning Through Geometric Manipulation and Refinement, Nov. 2, 2021, The Government of the United States of America, as represented by the Secretary of the Navy (Year: 2021).*

(Continued)

*Primary Examiner* — Kenneth J Malkowski
*Assistant Examiner* — Carville Albert Hollingsworth, IV
(74) *Attorney, Agent, or Firm* — Lindauer Law, PLLC

(57) ABSTRACT

An autonomous mobile device (AMD) uses sensors to explore a physical space and determine the locations of obstacles. Simultaneous localization and mapping (SLAM) techniques are used to process images from cameras to determine location and trajectory of the device. As the AMD moves and explores to generate an occupancy map, errors in the localization accrue. The occupancy map is processed to determine a graph that is based on, for a given point in physical space, a distance, relative direction, and a characteristic of a closest obstacle. A first graph based on a global occupancy map may be compared to a second graph based on a local occupancy map to determine a displacement between the local occupancy map and the global occupancy map. To facilitate loop closure, the AMD may navigate to a point along the first graph, where a loop closure process may be performed.

20 Claims, 14 Drawing Sheets

(56) References Cited

U.S. PATENT DOCUMENTS

| | | | |
|---|---|---|---|
| 11,164,036 B2* | 11/2021 | Irving | G06V 10/56 |
| 11,184,968 B2* | 11/2021 | Zhao | H05B 47/125 |
| 11,288,838 B2* | 3/2022 | Ma | G06T 7/277 |
| 11,300,963 B1* | 4/2022 | Webster | G05D 1/0223 |
| 2015/0184842 A1* | 7/2015 | Chemel | H05B 47/115 |
| | | | 702/104 |
| 2017/0157769 A1* | 6/2017 | Aghamohammadi | |
| | | | G05D 1/0217 |
| 2018/0210087 A1* | 7/2018 | Olson | G06V 20/58 |
| 2020/0377128 A1* | 12/2020 | Marczuk | G06Q 10/063 |

OTHER PUBLICATIONS

Meng Zhao, Occupancy Sensor Calibration and Occupancy Estimation, Nov. 23, 2021, Signify Holding B.V. (Year: 2021).*
Roger Webster, Robot Movement Constraint System, Apr. 12, 2022, Amazon Technologies, Inc. (Year: 2022).*
Dawson-Haggerty Stephen, System, Method, and Computer Program, for Transmitting Occupancy Data from Sensors to a Remote Server, Oct. 23, 2018, Building Robotics Inc. (Year: 2018).*
Ma Fuqiang, Image Processing Method and Apparatus, Mar. 29, 2022, Beijing Boe Optoelectronics Tech. Co. LTD. (Year: 2022).*
Beeson, et al., "Towards Autonomous Topological Place Detection Using the Extended Voronoi Graph", IEEE International Conference on Robotics and Automation (ICRA-05), 2005, 8 pgs. Retrieved from the Internet: URL https://www.cs.utexas.edu/users/qr/papers/Beeson-etal-icra-05.html.
Felzenszwalb, et al., "Distance Transforms of Sampled Functions", The University of Chicago, pp. 1-15. Retrieved from the Internet: URL: https://www.cs.cornell.edu/~dph/papers/dt.pdf.

* cited by examiner

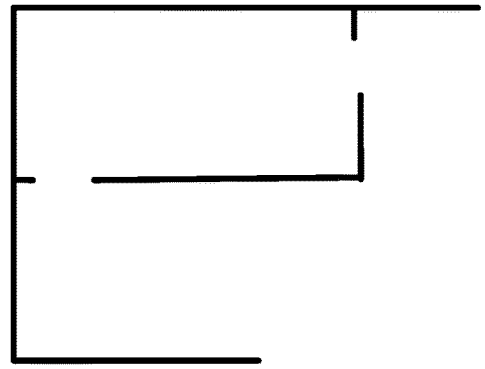

OCCUPANCY MAP (PARTIAL) 150

DETERMINE AN OCCUPANCY MAP OF AT LEAST A PORTION OF A PHYSICAL SPACE
902

↓

PROCESS THE OCCUPANCY MAP USING A DISTANCE TRANSFORM FUNCTION TO DETERMINE A FIRST GRAPH
904

↓

DETERMINE THE LOOP CLOSURE LOCATION BASED ON ONE OR MORE OF: A VERTEX, TERMINAL VERTEX, OR A DISTANCE TRANSFORM VALUE LESS THAN A THRESHOLD VALUE
906

GRAPH 910
TERMINAL VERTEX 916(1)
EDGE 914
LOOP CLOSURE LOCATION(S) 148
VERTEX 912
TERMINAL VERTEX 916(2)

FIG. 9

SYSTEM TO FACILITATE AUTONOMOUS MOBILE DEVICE MOVEMENT

BACKGROUND

An autonomous mobile device (AMD) moves throughout a physical space. To facilitate this movement, the AMD gathers information about the physical space to determine where obstacles are located and builds a map with this information.

COMPUTER PROGRAM LISTING

A computer program listing is submitted with this disclosure and is hereby incorporated by reference for all that it contains.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 9 is a flow diagram of a process for determining a loop closure location based at least in part on a graph generated using a distance transform function, according to some implementations.

Figure 1:
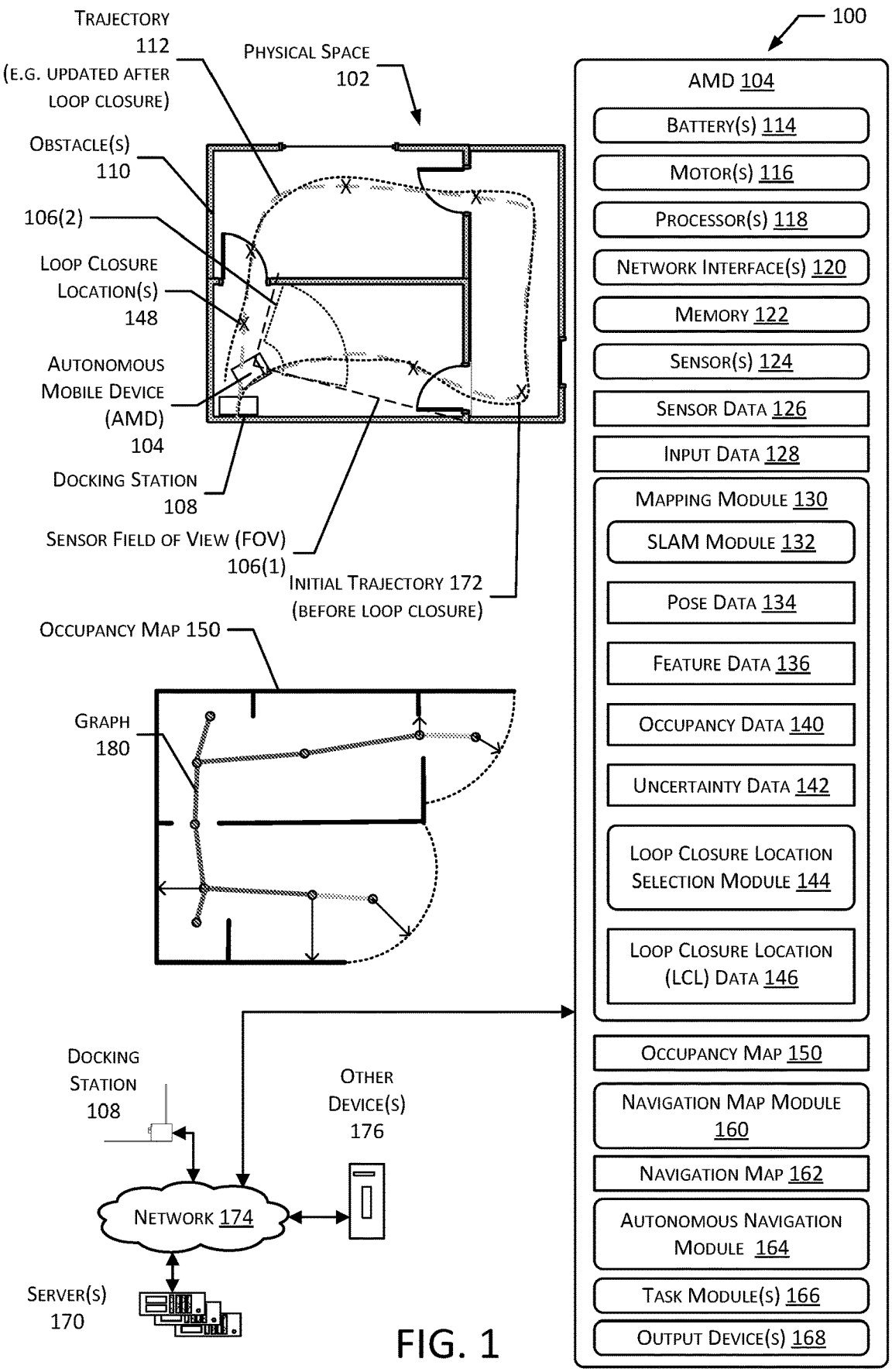
FIG. 1 illustrates a system for exploring and moving through a physical space with an autonomous mobile device (AMD) using loop closure locations, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD needs to have information about where obstacles are in the physical space. This information is used to plan a path for the AMD to traverse, to avoid collisions with obstacles, and so forth. For example, the AMD should be able to move from a first location to a second location while avoiding collisions with furnishings, walls, people, falling down stairs, and so forth.

An occupancy map is determined using sensor data from one or more sensors and provides information about where obstacles are in the physical space. The occupancy map comprises cells in a specified arrangement, a grid of cells. Each cell may be represented by an index value indicative of that cell within the grid. Each cell is associated with a particular location in the physical space. For example, each cell may represent an area in the physical space that is 5 centimeters (cm) by 5 cm. Each cell may also be associated with an occupancy value that indicates whether the particular area in the physical space associated with that cell is occupied by an obstacle, unoccupied, or whether there is no data that is associated with that cell being unobserved. For example, an occupancy value of −1 may indicate an unoccupied cell with no obstacle, an occupancy value of 0 indicates the cell has been unobserved, while +1 indicates the cell is occupied by an obstacle. For ease of discussion, and not necessarily as a limitation, description with regard to cells may refer to the data associated with the cells or, as appropriate, the physical space associated with the cell. For example, an action such as moving to a cell may comprise moving the AMD to the physical space associated with the cell.

The sensors on the AMD or in the physical space acquire the sensor data. The sensor data is processed to determine information such as a current location of the AMD in the physical space, and to provide the information that is used to determine the occupancy map. The sensors exhibit various limitations, including a particular field of view (FOV), working range, may require line of sight to operate, exhibit blind spots, and so forth. Except for very unusual circumstances such as very simple physical spaces, the sensors are not able to simultaneously see all of the areas in the physical space. As a result, the AMD gathers information about the physical space by moving and directing the FOV of the sensors in different directions.

As the AMD moves through the physical space, it uses simultaneous localization and mapping (SLAM) to determine where it is and how far it has moved. Localization is the process of determining where the AMD is in the physical space. For example, cameras may acquire images. These images are processed to determine the presence of features in the images, such as edges of doors, a picture frame on a wall, and so forth. A descriptor is information that describes a particular feature. Various techniques such a scale-invariant feature transform (SIFT) may be used to characterize the features and generate the descriptors. The SLAM may use data from other sensors such as motor encoders, inertial measurement units (IMU) with one or more accelerometers and gyroscopes, and so forth.

While the AMD is moving and SLAM is operating, SLAM provides as output a series of poses, each pose describing a location and rotations in space that are based at least in part on the apparent motion of observed features in the images. For example, a pose may comprise information about six dimensions (6D), that of three orthogonal axes and corresponding rotations about those axes. These poses may be combined to provide a trajectory of the AMD.

While the AMD is moving, other sensors are acquiring information about the physical space. One or more depth sensors may acquire depth data about the presence or absence of obstacles in the physical space. For example, the depth sensors may comprise a time-of-flight (TOF) depth camera, ultrasound, radar, and so forth. The depth data provided by a depth sensor is indicative of whether an obstacle is detected or not, and also includes information about the distance between the sensor and the obstacle and relative direction with respect to the sensor and an obstacle, if detected.

During operation of the AMD, various factors introduce uncertainty into the resulting poses. These factors may include sensor noise, changing lighting conditions that change the appearance of features in images, dynamic obstacles such as people moving through the physical space, places in the physical space that are relatively featureless, two or more different places in the physical space that have very similar features, and so forth. This uncertainty may manifest as apparent drift of the poses with respect to the physical space. This results in errors in the occupancy map. For example, if the localization of the AMD is incorrect, information about obstacles relative to that incorrect location is also incorrect. Continuing the example, if the localization of the AMD is incorrect by 39 centimeters (cm), the location of a wall that is detected by the AMD's sensors will also be incorrect.

As the AMD moves through the physical space, the uncertainty accumulates. For example, if the AMD starts at a docking station, moves around a home, and returns to that docking station, due to drift the AMD would determine that the location of the docking station has changed even though the docking station has remained stationary. Because of this accumulated uncertainty with regard to the localization, the resulting occupancy map would be incorrect.

To address this issue, SLAM of the AMD may utilize a technique known as loop closure. With loop closure, the AMD recognizes that it has returned to a previously visited area, thus "closing a loop" that returns the AMD to about the same place in the physical space. An assumption can be made that fixed objects have not been moved since the last visit. The loop closure process provides an updated trajectory which attempts to correct for drift. After loop closure, uncertainty may be reduced, but not necessarily eliminated. For example, before loop closure there may be uncertainty of 35 centimeters (cm). After loop closure, uncertainty may be reduced to 2 cm.

In one traditional approach, loop closure is performed if the robot crosses its own path. For example, loop closure may be performed by comparing information associated with every pose with information about all previous poses to determine if a robot has been at that location previously. However, this approach is extremely memory-intensive and very computationally intensive. A large set of data about those previously stored poses must be maintained and subsequently compared. This approach also relies on the assumption that the robot will backtrack or cross its own path at a later time.

In a variation on this traditional approach, a fixed landmark that can be unambiguously detected is used. The robot may begin an exploration process and end the exploration process from this fixed landmark. For example, the robot may start exploration while at a docking station. The docking station may emit a signal that the robot is able to home in on and return to an initial starting location. As uncertainties accrue in localization, the drift increases. A drawback of this approach is that it requires the use of an unambiguous and invariant landmark. Another drawback is that it is possible for the uncertainty during exploration to become so great that the robot becomes lost and is unable to find the fixed landmark.

With these traditional approaches the resulting occupancy map produced still contains inaccuracies. Updating the entire occupancy map after loop closure involves applying one or more transforms to change the location of obstacles as designated in the occupancy map, based on the results of the loop closure process. However, such transforms may not be applicable to the entire occupancy map. As a result, the occupancy map remains inaccurate. For example, compared to the physical space, the occupancy map may indicate walls that are askew, hallways that are not straight, and so forth.

Described in this disclosure is a system that determines a graph based on the occupancy map. The occupancy map comprises data that is indicative of physical obstacles that were detected by the AMD as well as unexplored areas that are designated as obstacles. The graph comprises points calculated using a distance vector transform function. For example, the graph depicts a "skeleton" between the obstacles in the occupancy map. The graph determined by the distance vector transform function comprises points that are associated with locations that are equal distances from all closest obstacles indicated by the occupancy map. Each point on the graph also comprises information indicative of whether the closest obstacle is a physical obstacle or an unexplored area. Edges of the graph that consist of points associated with physical obstacles may be "strong" while edges that include points associated with unexplored areas may be "weak". The relative strength or weight of an edge may be based on the proportion of unexplored areas to physical obstacles. Vertexes may comprise endpoints on the graph or points where two or more edges join. A relative strength or weight of the edge may be based on the weights associated with the edges.

Sensor data associated with one or more of locations on the graph or vertexes of the graph may be stored for later use as loop closure locations. As the AMD moves through the physical space, the SLAM system determines an uncertainty value that indicates the degree of uncertainty or drift that is estimated to be associated with localization data. When the uncertainty value reaches a threshold value, the AMD may use the graph to determine and move towards a loop closure location. In some implementations, the threshold value may be determined based on factors such as one or more dimensions associated with the AMD, such as width, turning radius, and so forth. Upon return to or near the loop closure location, the data previously acquired at the loop closure location facilitates the loop closure process. Once the loop closure process is complete, the AMD may resume other movement.

In one implementation, the graph and corresponding vertices may be determined dynamically, while the AMD is exploring a physical space. These vertices may include locations that the AMD has previously visited or may comprise locations that have been explored but not yet been visited by the AMD. In another implementation, the graph may be determined after at least part of exploration has been completed and used for subsequent navigation. At a vertex or other location associated with the graph, the AMD may perform additional operations to acquire data to facilitate a future loop closure process. For example, at the vertex the AMD may move the sensors so that data is acquired in all horizontal directions. Continuing the example, the AMD may perform a spiral movement, stop and perform a 360 degree rotation, or perform other maneuvers to acquire sensor data of the physical space to facilitate loop closure.

Additionally, the distance transform vector graph may be used to determine an offset between a local occupancy map and a global occupancy map. The uncertainty described above may result in a local occupancy map diverging from a global occupancy map. A global graph is generated by processing the global occupancy map using the distance transform vector. A local graph is generated by processing the local occupancy map using the distance transform vector. Due to the uncertainty mentioned above, the local graph may have some deviation relative to the global graph, but a correspondence between the two may be determined. By determining this correspondence, an offset may be determined between the global graph's underlying global occupancy map and the local graph's underlying local occupancy map. Once determined, the AMD may be directed to a point along the global graph that is deemed suitable for loop closure. This may be a closest vertex of the global graph, or may be a closest vertex that is proximate to a planned path of the AMD. This determination of offset allows the AMD to rapidly move towards a loop closure location and more quickly complete the loop closure process.

A loop closure location may be designated based on one or more of feature characteristics, assessment of the occupancy map that is available, semantic data that is associated with the physical space, impediment data about impediments to movement of the AMD, and so forth. The determination of the loop closure location may be based on the feature characteristics that are within a sensor field of view (FOV). For example, a location in the physical space where the AMD is able to use cameras to acquire images of several different walls upon which are various decorations may be deemed a loop closure location. The decorations on the wall are invariant in that they may be expected to remain unchanging over time, and the distinctiveness of the scene provides many different features that may be used by the SLAM system.

Semantic data about the physical space may be available. In one implementation, object recognition algorithms may be used to associate semantic labels with obstacles in the occupancy map. For example, a machine vision system may use image data acquired from a camera on the AMD to determine that the image depicts a "door". The portion of the occupancy map that is associated with the door may be annotated with a semantic label "door". Some semantic labels may be associated with a need for reduced uncertainty. For example, doorways, hallways, and so forth may require that the occupancy map have accurate information about the location of obstacles to facilitate navigation of the AMD. Inaccurate information in the occupancy map could lead to inadvertent collisions, impair autonomous route planning by the AMD, and so forth. In some implementations, the semantic data may be used to determine a candidate loop closure location before the AMD visits that location. The AMD may then move to the candidate loop closure location, acquire sensor data, and so forth. If the sensor data is deemed suitable, the candidate loop closure location may be deemed a loop closure location.

Impediment data about the physical space may be available. The impediment data is indicative of those areas within the occupancy map that impede the movement of the AMD. For example, the impediment data may be indicative of a thick rug that keeps the wheels of the AMD from operating properly. In another example, the impediment data may indicate a floor vent that could trap a wheel of the AMD. The impediment data may be based on sensor data, user input, error data, and so forth.

As mentioned above, drift accumulates, resulting in some uncertainty as to where the poses produced by SLAM are with respect to the physical space and one another. Once a loop closure event takes place at a loop closure location, the updated trajectory comprises updated poses. For example, compared to an initial pose, an updated pose may have one or more of location or orientation changed by translation or rotation to a different set of coordinates. The pose still represents the same place in the physical space, but the updated pose may differ from the initial pose with respect to at least one degree of freedom.

The process of generating the graph based on the distance transform vector function and subsequently using locations associated with the graph as loop closure locations results in an occupancy map that is highly accurate in representing the physical space. As a result, subsequent navigation of the AMD that is based on the occupancy map is more efficient and effective. For example, by having a properly aligned and accurate occupancy map, the AMD is able to minimize improper routing and avoid having to re-route, such as when encountering a wall along the path where a door is expected.

Information about the loop closure locations may be persistent. At later times when the AMD revisits part of the physical space, if the uncertainty value associated with SLAM operation increases beyond the threshold value, the AMD may use the loop closure location to provide a loop closure. This further improves system performance in situations where some changes in the physical space take place between subsequent visits of the AMD.

Illustrative System

FIG. 1 illustrates a system 100 for exploring and moving through a physical space 102 with an autonomous mobile device (AMD) 104 using loop closure locations, according to some implementations.

The AMD 104 is shown at a current location. The AMD 104 may include one or more sensors 124 (described below) that have different fields of view (FOV). For example, a first sensor FOV 106(1) for a pair of cameras is depicted as is a second sensor FOV 106(2) for a time-of-flight depth sensor.

The AMD 104 may be configured to dock or connect to a docking station 108. The docking station 108 may provide external power which the AMD 104 may use to charge a battery 114 of the AMD 104.

One or more obstacles 110 may be present within the physical space 102. For example, obstacles 110 may comprise walls, furnishings, stair wells, people, and so forth. While moving from one location to another, the AMD 104 needs to determine where it is at a given time, determine the location of obstacles 110, and move while avoiding collisions with any of these obstacles 110. A command to move may be the result of input from a user, a previously scheduled task, a response to input from one or more sensors 124, a command from an external computing device, or another source.

The AMD 104 may move through the physical space 102. The motion of the AMD 104 may be described as a trajectory 112, such as shown here. In some implementations the trajectory 112 may comprise a series of poses. Each pose may be indicative of a particular location with respect to a plurality of orthogonal axes and rotation with respect to individual ones of the axes. For example, the pose may comprise six dimensional (6D) information indicative of coordinates in three-dimensional space with respect to a designated origin, and rotation with respect to each of the three axes.

The AMD 104 may include battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth. In another example, actuators may move legs allowing the AMD 104 to walk.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANS), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include microphones, time-of-flight (TOF) sensors, cameras, LIDAR, and so forth. The sensors 124 may generate sensor data 126. The sensors 124 are discussed in more detail with regard to FIG. 3.

During operation the AMD 104 may determine input data 128. The input data 128 may include or be based at least in part on sensor data 126 from the sensors 124 onboard the AMD 104. In one implementation, a speech processing module may process raw audio data obtained by a microphone on the AMD 104 and produce input data 128. For example, the user may say "robot, come here" which may produce input data 128 "come here". In another implementation, the input data 128 may comprise information such as a command provided by another computing device, such as a smartphone or tablet computer.

A mapping module 130 determines a representation of the physical space 102 that includes the obstacles 110 and their locations in the physical space 102. During operation, the mapping module 130 uses the sensor data 126 from various sensors 124 to determine information such as where the AMD 104 is, how far the AMD 104 has moved, the presence of obstacles 110, where those obstacles 110 are, and so forth.

The mapping module 130 uses a simultaneous localization and mapping (SLAM) module 132. Localization is determining where the AMD 104 is in the physical space 102, and may utilize some external reference. For example, cameras may acquire images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module 132 may provide as output a series of poses, each pose describing a location and rotations in the physical space 102. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. During successive times, as the AMD 104 moves and additional images are acquired from locations in the physical space 102, the apparent change in position of the same feature across the additional images may be used to determine subsequent poses. In some implementations a pose may comprise information about six dimensions (6D), that of three orthogonal axes and corresponding rotations about those axes.

The SLAM module 132 may also use data from other sensors 124 such as motor encoders, inertial measurement units (IMU) with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module 132 over time describe the trajectory 112. For example, trajectory data may comprise a time series of pose data 134 from the SLAM module 132.

During operation of the AMD 104, various factors introduce uncertainty into the poses provided by the SLAM module 132. These factors may include sensor noise, changing lighting conditions that change the appearance of features in images, dynamic obstacles such as people moving through the physical space 102, and so forth. This uncertainty may manifest as apparent drift of the poses with respect to the physical space 102. As the AMD 104 moves through the physical space 102, the uncertainty accumulates. For example, if the AMD 104 starts at the docking station 108, moves around the physical space 102, and returns to that docking station 108, due to drift the AMD 104 determines an initial trajectory 172 that does not match the trajectory 112 followed. Due to the accrued uncertainty, the AMD 104 may determine that the location of the docking station 108 has changed, even though the docking station 108 has remained stationary.

To address the uncertainty in localization that may accrue, the AMD 104 may utilize loop closure locations 148 to facilitate a loop closure process. With loop closure, the AMD 104 recognizes it has returned to a previously visited area, thus "closing a loop" that returns the AMD 104 to about the same place in the physical space 102. For loop closure to occur, the AMD 104 does not necessarily assume a pose identical to a previously obtained pose, but rather needs to be close enough so that the features associated with that pose can be obtained by the sensors 124 and determined. To facilitate loop closure, an assumption can be made that fixed objects have not been moved since the last visit. Output from the loop closure may be used to update the poses and initial trajectory 172 to produce the trajectory 112 that attempts to correct for drift. After performing loop closure, uncertainty may be reduced, but uncertainty is not necessarily eliminated.

During operation, the mapping module 130 may use the SLAM module 132 to determine pose data 134 and feature data 136. The pose data 134 may comprise information indicative of pose. For example, the pose data 134 may include information indicative of a location in the physical space 102 and orientation of the AMD 104 relative to the physical space 102. Feature data 136 may also be associated with at least a portion of the pose data 134. The feature data 136 may comprise information about the features determined to be present in the sensor data 124 acquired while at that pose. For example, image data associated with the pose may be processed to determine one or more features, and those features may be characterized to determine descriptors that are then stored as the feature data 136.

While the AMD 104 is operating, the sensors 124 may be used to acquire sensor data 126 comprising information about the physical space 102. In addition to cameras, the AMD 104 may include depth sensors that may determine depth data about the presence or absence of obstacles 110 in the physical space 102, and so forth. For example, the sensors 124 may comprise a time-of-flight (TOF) depth camera, ultrasound, radar, and so forth. The depth data is indicative of whether an obstacle 110 is detected or not, and also includes information about the distance between the sensor 124 and the obstacle and relative direction with respect to the sensor 124 of an obstacle 110, if detected.

The sensor data 126 may be processed to determine occupancy data 140. The occupancy data 140 is indicative of a particular area in the physical space 102, relative to the pose of the AMD 104 at the time the sensor data 126 was acquired, and whether that area contains an obstacle 110 or is determined to be free from obstacles 110.

As mentioned above, drift accumulates, resulting in some uncertainty as to where the poses produced by the SLAM module 132 are with respect to the physical space 102 and one another. As a result, the initial pose data 134 and occupancy data 140 that is associated with that initial pose data 134 may drift as well. If uncorrected, this drift could result in an incorrect mapping of the physical space 102. For example, drift may result in a door being misplaced, a wall being incorrectly placed in two different locations, and so forth.

When a loop closure takes place, updated pose data 134 is determined along with the updated trajectory 112. The updated pose data 134 may have one or more of location or orientation of the originally obtained initial pose data 134 changed by translation or rotation to a different set of coordinates. The updated pose data 134 still represents the same place in the physical space 102, but the updated pose may differ from the initial pose with respect to at least one degree of freedom.

After loop closure, the occupancy data 140 is now aligned to the updated pose data 134 and corresponding trajectory 112. This aligned occupancy data 140 may be used to generate an occupancy map 150. For example, the mapping module 130 may combine the occupancy data 140, now aligned following loop closure, to produce an occupancy map 150.

The occupancy map 150 may comprise data that indicates the location of one or more obstacles 110, such as a table, wall, stairwell, and so forth. In some implementations, the occupancy map 150 may comprise a plurality of cells with each cell of the plurality of cells representing a particular area in the physical space 102. Data, such as occupancy values, may be stored that indicates whether an area of the physical space 102 associated with the cell is unobserved, occupied by an obstacle 110, or is unoccupied. An obstacle 110 may comprise an object or feature that prevents or impairs traversal by the AMD 104. For example, an obstacle 110 may comprise a wall, stairwell, and so forth.

The occupancy map 150 may be manually or automatically determined as part of an exploration process. This exploration may include an explicit exploration in which the AMD 104 moves through the physical space 102, or may be incidental exploration to movement of the AMD 104. For example, explicit exploration may involve the AMD 104 starting with no occupancy map 150 and moving throughout the physical space 102 to determine occupancy data 140 and the corresponding occupancy map 150. In another example incidental exploration may involve the AMD 104 following the user. Continuing the example, during a learning phase the user may take the AMD 104 on a tour of the physical space 102, allowing the mapping module 130 of the AMD 104 to determine occupancy data 140 and the corresponding occupancy map 150. The user may provide input data 128 such as tags or other semantic data that designates a particular obstacle type, such as "furniture" or "fragile". In another example, during subsequent operation, the AMD 104 may generate the occupancy map 150 that is indicative of locations and types of obstacles such as chairs, doors, stairwells, and so forth as it moves unattended through the physical space 102.

A loop closure location selection module 144 may operate to determine one or more loop closure locations (LCLs) 148. Information indicative of a loop closure location 148 may be stored as loop closure location data 146. The loop closure location selection module 144 may determine that a given location in the physical space 102 is suitable for use as a loop closure location 148 using one or more techniques, including but not limited to assessing feature characteristics, assessing the occupancy map 150 (or portion thereof that is available), assessing semantic data, assessing impediment data, and so forth. For example, while the AMD 104 is exploring the physical space 102, loop closure locations 148 may be designated and loop closure location data 146 stored for later use. Operation of the loop closure location selection module 144 is discussed in more detail with regard to FIGS. 6-11.

During operation, the SLAM module 132 provides uncertainty data 142 that is indicative of the uncertainty associated with pose data 134. For example, the SLAM module 132 may determine the uncertainty data 142 based on distance traveled, number of features identified in the feature data 136, odometry distance, number of turns made, and so forth. If the uncertainty value indicated by the uncertainty data 142 exceeds a threshold value, a loop closure location 148 may be selected. In some implementations the threshold value may be determined based on factors such as one or more dimensions associated with the AMD 104, such as width, turning radius, maximum speed of the AMD 104, weight of the AMD 104, and so forth. For example, a narrow, lightweight, and slow-moving AMD 104 may be permitted to operate with a greater uncertainty value than a larger AMD 104 that moves more quickly. The AMD 104 may then be moved to the selected loop closure location 148.

At the loop closure location 148, the AMD 104 uses the loop closure location data 146 to complete the loop closure process, reducing uncertainty in localization by the SLAM module 132. The AMD 104 may remain at the loop closure location 148 and perform the loop closure process until one or more of the uncertainty value is below a threshold value, until no further decrease in uncertainty value is obtained, until a time limit expires, or other conditions. For example, the AMD 104 may move to different poses at or near the loop closure location 148 and continue to gather sensor data 126 until the uncertainty values for successive loop closures remains the same or exhibits a relatively small change. After the loop closure process is completed, uncertainty in the location by the SLAM module 132 may be reduced but is not necessarily zero. A first uncertainty threshold that is associated with the AMD 104 moving to a loop closure location 148 may differ from a second uncertainty threshold that is associated with the AMD 104 moving from the loop closure location 148. For example, the value of the first uncertainty threshold may be greater than the second uncertainty threshold. Continuing the example, the AMD 104 uncertainty data 142 may indicate a first uncertainty value of 0.63 that is greater than a first uncertainty threshold of 0.30. As a result, the AMD 104 moves to the loop closure location 148 to reduce the uncertainty using the loop closure process. While at the loop closure location 148, the AMD 104 may remain until the uncertainty data 142 indicates a second uncertainty value that is less than a second uncertainty threshold of 0.10.

The selection of which of the loop closure locations 148 the AMD 104 should return to may be based on one or more factors. These factors may include distance, uncertainty value associated with the loop closure location 148, likelihood of loop closure being completed, number of turns to reach the loop closure location 148, and so forth. For example, a loop closure location 148 may be selected that is closest to a current location of the AMD 104.

Each loop closure location 148 may be associated with an uncertainty value that is indicative of lowest uncertainty of localization that results from a loop closure completed at that loop closure location 148. For example, a first loop closure location 148(1) may have an uncertainty value of 0.05 while a second loop closure location 148(2) may have an uncertainty value of 0.17. The selection of the loop closure location 148 to use may be based on selecting a lowest uncertainty value within a threshold distance, within a room, and so forth.

Data indicative of likelihood of loop closure at a loop closure location 148 may be used to select a loop closure location. The likelihood of loop closure may be determined based on previous loop closure attempts at that loop closure location 148 or may be estimated. For example, the first loop closure location 148(1) may result in a higher percentage of loop closure completions than the second loop closure location 148(2). In another example, the likelihood of loop closure may be determined based on feature data characteristics, semantic data, and so forth. For example, a loop closure location 148 from which a large number of invariant features are visible may be deemed likely to have a high likelihood of loop closure.

Loop closure locations 148 that provide feature data 136 in additional directions with regard to the physical space 102 may be deemed to have a greater likelihood of loop closure. For example, a first loop closure location 148(1) may have feature data 136 comprising invariant features in all directions—north, south, east, and west. Continuing the example, a second loop closure location 148(2) may have feature data 136 only to the east. The first loop closure location 148(1) may be preferred over the second loop closure location 148(2). The additional feature data 136 associated with the first loop closure location 148(1) may facilitate the AMD 104 performing the loop closure process with less movement from one location to another, rotation, and so forth, as previously stored LCL data 146 is available in all directions.

In other implementations, other factors may be used to select a loop closure location 148 to use. For example, the number of turns or other maneuvers associated with a path from a current location to a loop closure location 148 may be used to select a loop closure location 148. Continuing the example, the first loop closure location 148(1) may be reached by following a straight line path 2 meters in length, while the second loop closure location 148(2) may be reached by following a path with two turns that has a total length of 1.7 meters. As turns may introduce greater uncertainty, the first loop closure location 148(1) with the straighter path may be selected for use. Various combinations of these or other factors may be used. For example, an aggregate value may be determined for each loop closure location 148 in a set of loop closure locations 148. The aggregate value may be determined based on a first weight value multiplied by a distance from the current location to the loop closure location 148, a second weight value multiplied by the uncertainty value associated with the loop closure location 148, and so forth.

By using the loop closure location data 146 in an ongoing fashion, such as during exploration, the AMD 104 substantially reduces the uncertainty in the pose data 134 and consequently reduces the uncertainty in the occupancy data 140. As a result, the overall accuracy of the occupancy map 150 is substantially improved. Additional advantages are discussed in the following figures.

Modules described herein, such as the mapping module 130, may provide various processing functions such as de-noising, filtering, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

The mapping module 130 may process the occupancy map 150 with a distance vector transform (DVT) function to determine a graph 180. The DVT function produces a set of points that correspond to locations in the physical space 102 that are at a minimum distance between the corresponding location in the physical space 102 of the point on the graph 180, such as a set of coordinates of the occupancy map 150, and an obstacle 110 indicated by the occupancy map 150. For example, each point of the first graph 180 is associated with a location in the physical space 102 that is equal distances from all closest obstacles that are indicated by the occupancy map 150. In addition to the distance to the closest obstacle as indicated by the occupancy map 150, the DVT function also takes into consideration whether the obstacle 110 is a physical obstacle or an unexplored area obstacle. The graph 180 and the distance vector transform are discussed in more detail with regard to FIGS. 13-14.

A navigation map module 160 uses the occupancy map 150 as input to generate a navigation map 162. For example, the navigation map module 160 may produce the navigation map 162 by inflating or enlarging the apparent size of obstacles 110 as indicated by the occupancy map 150. In some implementations the graph 180 may be used for navigation.

An autonomous navigation module 164 provides the AMD 104 with the ability to navigate within the physical space 102 without real-time human interaction. The autonomous navigation module 164 may implement, or operate in conjunction with, the mapping module 130 to determine one or more of the occupancy map 150, the graph 180, the navigation map 162, or other representations of the physical space 102. The autonomous navigation module 164 is discussed in more detail with regard to FIG. 2.

The AMD 104 autonomous navigation module 164 may generate path plan data that is indicative of a path through the physical space 102 from the current location to a destination location. The AMD 104 may then begin moving along the path. In some implementations, the graph 180 may be considered when generating the path plan data. For example, the path may be compared to the graph 180. The path may be modified to include a location associated with the graph 180 such as a vertex, so that the AMD 104 passes through a location likely to facilitate loop closure.

While moving along the path, the AMD 104 may assess the physical space 102 and update or change the path as appropriate. For example, if an obstacle 110 appears in the path, the mapping module 130 may determine the presence of the obstacle 110 as represented in the occupancy map 150 and navigation map 162. The now updated navigation map 162 may then be used to plan an alternative path to the destination location.

The AMD 104 may utilize one or more task modules 166. The task module 166 comprises instructions that, when executed, provide one or more functions. The task modules 166 may perform functions such as finding a user, following a user, present output on output devices 168 of the AMD 104, perform sentry tasks by moving the AMD 104 through the physical space 102 to determine the presence of unauthorized people, and so forth.

The AMD 104 includes one or more output devices 168, such as one or more of a motor 116, light, speaker, display, projector, printer, and so forth. One or more output devices 168 may be used to provide output during operation of the AMD 104. The output devices 168 are discussed in more detail with regard to FIG. 3.

The AMD 104 may use the network interfaces 120 to connect to a network 174. For example, the network 174 may comprise a wireless local area network, that in turn is connected to a wide area network such as the Internet.

The docking station 108 may also be connected to the network 174. For example, the docking station 108 may be configured to connect to the wireless local area network 174 such that the docking station 108 and the AMD 104 may communicate.

The AMD 104 may access one or more servers 170 via the network 174. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 170 for further processing. The servers 170 may process the spoken audio and return to the AMD 104 data that may be subsequently used to operate the AMD 104.

The AMD 104 may also communicate with other devices 176. The other devices 176 may include one or more devices that are within the physical space 102 such as a home or associated with operation of one or more devices in the physical space 102. For example, the other devices 176 may include a doorbell camera, a garage door opener, a refrigerator, washing machine, and so forth. In some implementations the other devices 176 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
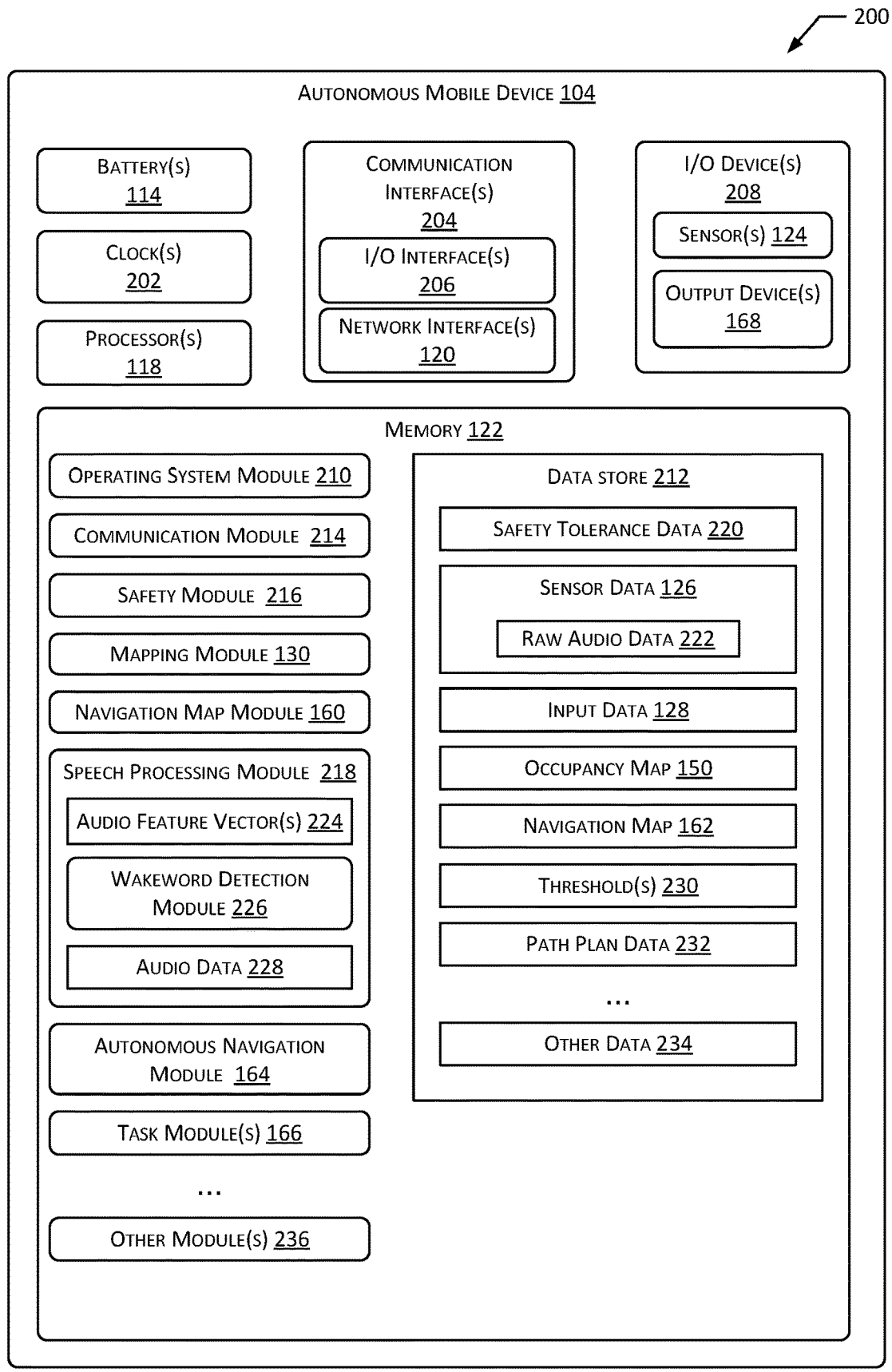
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 126, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 176 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 168 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 176 such as other AMDs 104, docking stations 108, routers, access points, and so forth. The network interfaces 120 may include devices configured to couple to personal area networks (PANS), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 176 including other AMDs 104, servers 170, network attached storage devices, and so forth.

A communication module 214 may be configured to establish communication with other devices 176, such as other AMDs 104, an external server 170, a docking station 108, and so forth. The communications may be authenticated, encrypted, and so forth.

Other modules within the memory 122 may include a safety module 216, the mapping module 130, the navigation map module 160, the autonomous navigation module 164, the one or more task modules 166, a speech processing module 218, or other modules 236. The modules may access data stored within the data store 212, including safety tolerance data 220, sensor data 126, other data 234, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The navigation map module 160 uses the occupancy map 150 as input to generate the navigation map 162. The navigation map module 160 may produce the navigation map 162 to inflate or enlarge the obstacles 110 indicated by the occupancy map 150. One or more inflation parameters may be used during operation. The inflation parameters provide information such as inflation distance, inflation adjustment values, and so forth. In some implementations the inflation parameters may be based at least in part on the sensor FOV 106, sensor blind spot, physical dimensions of the AMD 104, and so forth.

The speech processing module 218 may be used to process utterances of the user. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 174 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 170 for speech processing. The audio data 228 corresponding to audio obtained by the microphone may be processed locally on one or more of the processors 118, sent to a server 170 for routing to a recipient device or may be sent to the server 170 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 160, prior to sending to the server 170, and so forth.

The speech processing module 218 may include or access an automated speech recognition (ASR) module. The ASR module may accept as input raw audio data 222, audio feature vectors 224, or other sensor data 126 and so forth and may produce as output the input data 128 comprising a text string or other data representation. The input data 128 comprising the text string or other data representation may be processed by the navigation map module 160 to determine the command to be executed. For example, the utterance of the command "robot, come here" may result in input data 128 comprising the text string "come here". The wakeword "robot" may be omitted from the input data 128.

The autonomous navigation module 164 provides the AMD 104 with the ability to navigate within the physical space 102 without real-time human interaction. The autonomous navigation module 164 may implement, or operate in conjunction with, the mapping module 130 to determine the occupancy map 150, the navigation map 162, or other representation of the physical space 102. In one implementation, the mapping module 130 may use one or more simultaneous localization and mapping ("SLAM") techniques. The SLAM algorithms may utilize one or more of maps, algorithms, beacons, or other techniques to navigate. The autonomous navigation module 164 may use the navigation map 162 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 116 connected to the wheels. For example, the autonomous navigation module 164 may determine the current location within the physical space 102 and determine path plan data 232 that describes the path to a destination location such as the docking station 108.

The autonomous navigation module 164 may utilize various techniques during processing of sensor data 126. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 126, and so forth. For example, an external server 170 may send a command that is received using the network interface 120. This command may direct the AMD 104 to proceed to find a particular user, follow a particular user, and so forth. The AMD 104 may then process this command and use the autonomous navigation module 164 to determine the directions and distances associated with carrying out the command. For example, the command to "come here" may result in the task module 166 sending a command to the autonomous navigation module 164 to move the AMD 104 to a particular location near the user and orient the AMD 104 in a particular direction.

The AMD 104 may connect to the network 174 using one or more of the network interfaces 120. In some implementations, one or more of the modules or other functions described here may execute on the processors 118 of the AMD 104, on the server 170, or a combination thereof. For example, one or more servers 170 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth.

Figure 3:
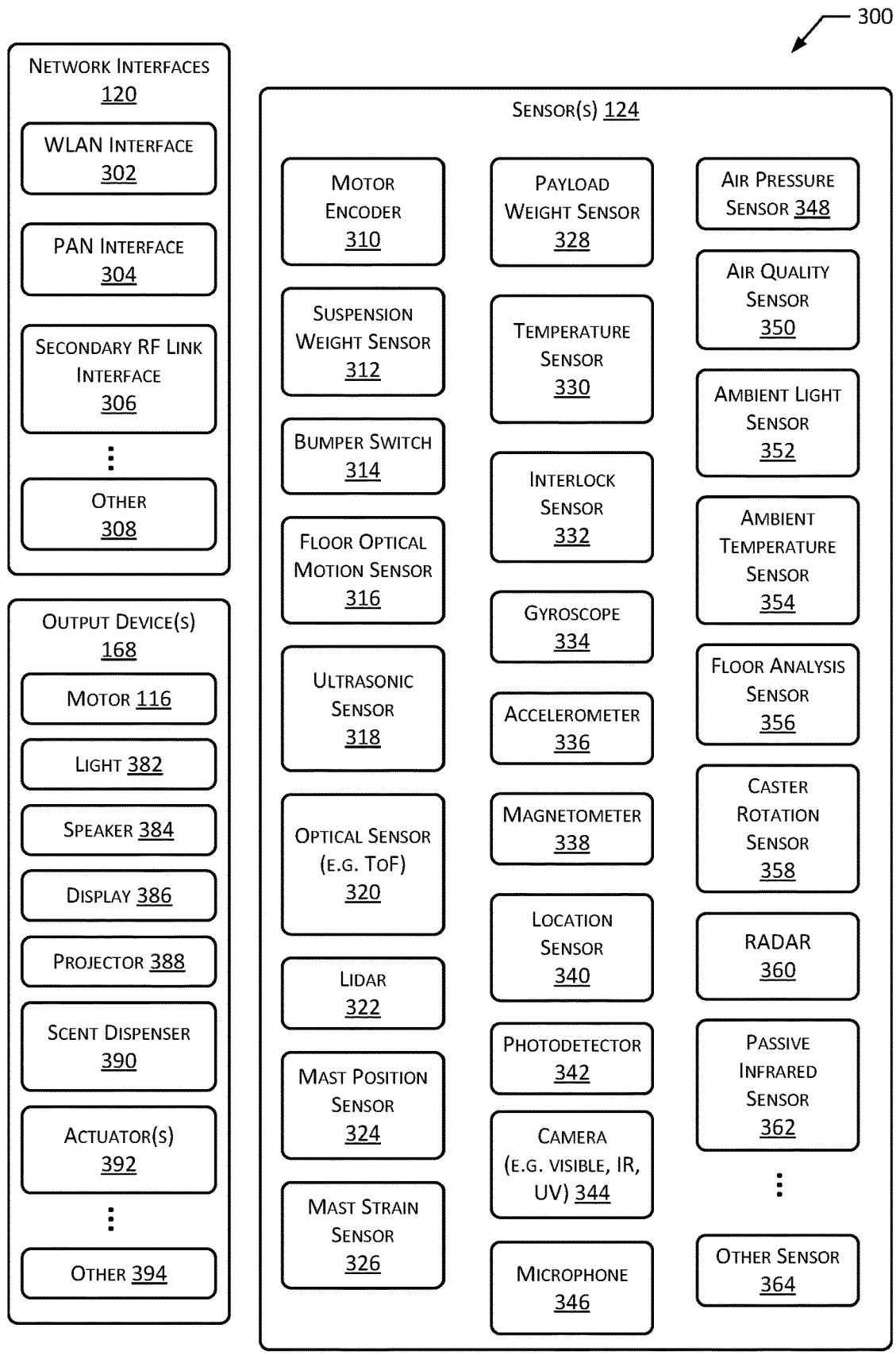
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 168, according to some implementations. The components illustrated here are provided by way of illustration and not necessarily as a limitation. For example, the AMD 104 may utilize a subset of the particular network interfaces 120, output devices 168, or sensors 124 depicted here, or may utilize components not pictured. One or more of the sensors 124, output devices 168, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 176 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 108, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 164 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited. For example, the threshold value may comprise a weight of a load that compresses a suspension system to a minimum height, or results in a mass that exceeds a torque output of the motors 116 to maintain a minimum acceleration.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 164 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 164 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down. For example, the threshold value may be determined based on component specifications, such as a maximum permissible temperature of the batteries 114.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 164. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 164, the task module 166, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 164. One or more touch sensors may be utilized to determine contact with a user or other objects.

The AMD 104 may include one or more output devices 168. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

Figure 4:
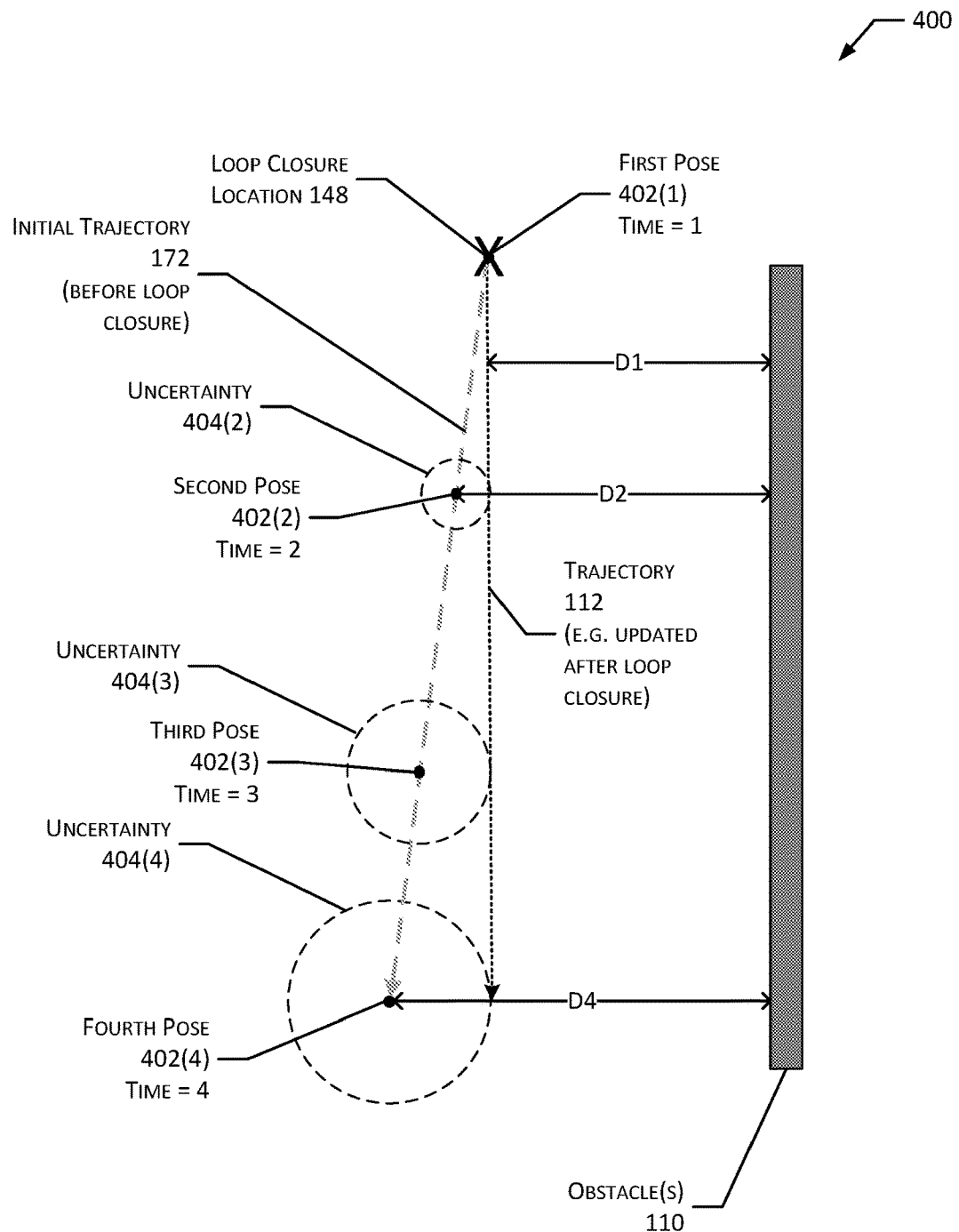
FIG. 4 illustrates increasing uncertainty of poses as the AMD moves through the physical space, according to some implementations.

FIG. 4 illustrates at 400 increasing uncertainty of poses as the AMD 104 moves through the physical space 102, according to some implementations. In this illustration an obstacle 110, such as a wall, is depicted to the right. Shown is an initial trajectory 172, such as using pose data 134 before loop closure and the actual trajectory 112 determined after loop closure. A loop closure location 148 is depicted corresponding to a first pose 402(1) at time=1. The AMD 104 proceeds to move, having a second pose 402(2) at time=2, a third pose 402(3) at time=3, and a fourth pose 402(4) at time=4. For each of these poses, uncertainty 404 associated with each pose 402 is shown as a circle with a radius indicative of an uncertainty value. At time=1, the AMD 104 is at a distance D1 from the obstacle 110. While moving, the AMD 104 actually does maintain that distance D1 from the obstacle 110. However, due to the uncertainty of the SLAM localization, an apparent distance D2 between a location of the second pose 402(2) and the obstacle 110 is greater than D1. Likewise, an apparent distance D4 between a location of the fourth pose 402(4) and the obstacle is greater than D2, due to accumulation of the uncertainty 404.

Without the correction in the pose data 134 produced by the loop closure process, the AMD 104 would not have accurate localization data. As a result, the occupancy data 140 would be incorrect, as would the occupancy map 150. In this illustration, if uncorrected, the occupancy map 150 may indicate that the obstacle 110 is askew. This is illustrated in FIG. 5.

Figure 5:
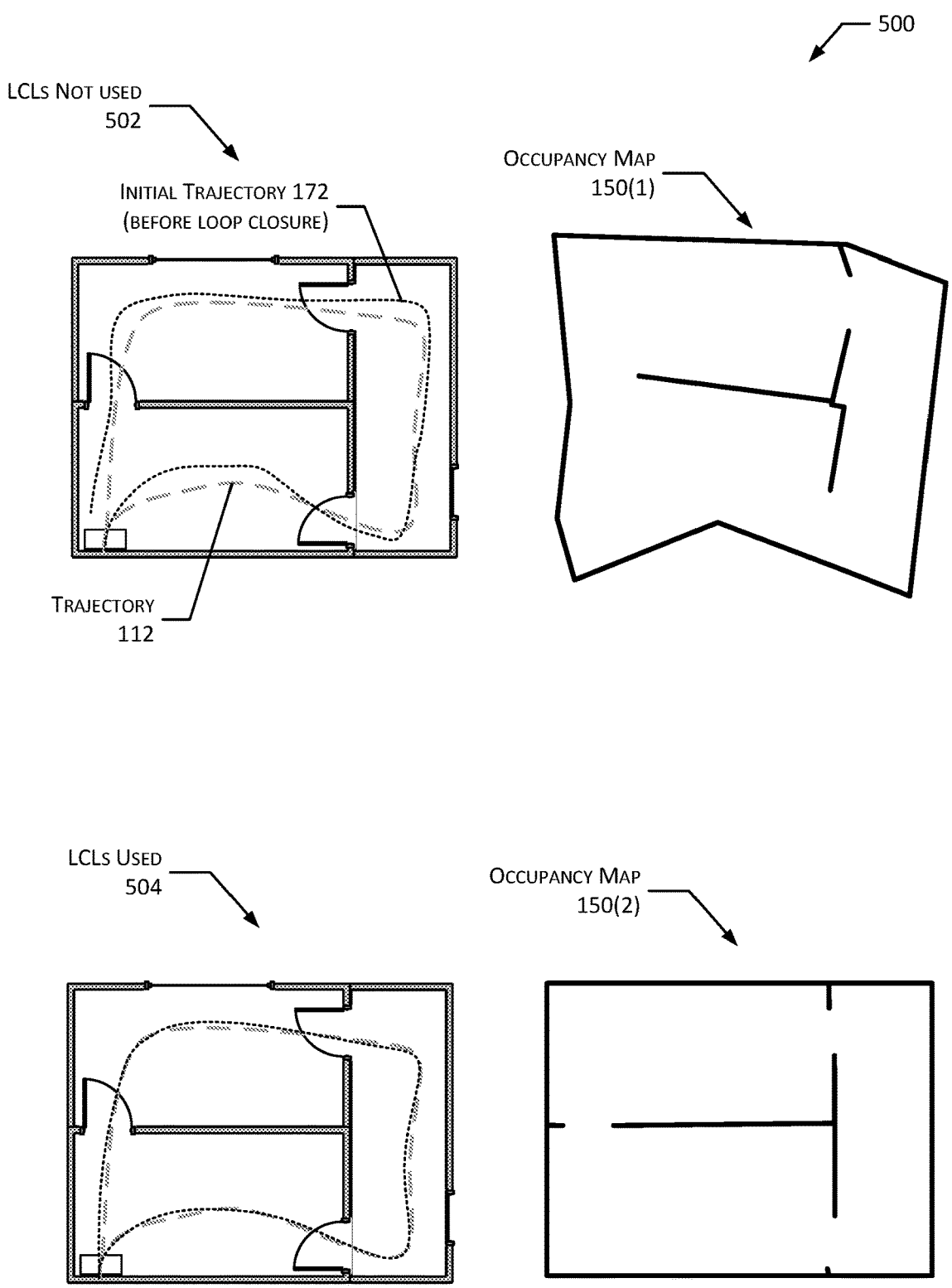
FIG. 5 illustrates a view of trajectories and occupancy maps without the use of loop closure locations and with the use of loop closure locations, according to some implementations.

FIG. 5 illustrates at 500 the effects of loop closure on an occupancy map 150, according to some implementations. At 502 an illustration of the physical space 102 is shown with the initial trajectory 172 and the trajectory 112, uncorrected using the loop closure techniques described in this disclosure. For example, this situation may occur when loop closure is only performed upon return to the docking station 108. The resulting occupancy map 150(1) is inaccurate and grossly distorted. This inaccuracy may impair route planning, resulting in the AMD 104 failing to move to an otherwise reachable location, following a route that is longer in the physical space 102 than indicated by the occupancy map 150(1), and so forth.

At 504 an illustration of the physical space 102 is also shown, corrected using the loop closure techniques described in this disclosure. As a result, the initial trajectory 172 and the trajectory 112 are closely aligned. Loop closure may occur more frequently, reducing accumulated errors and resulting in an occupancy map 150(2) that is substantially more accurate. As a result of this improved accuracy, operation of the AMD 104 is improved.

Figure 6:
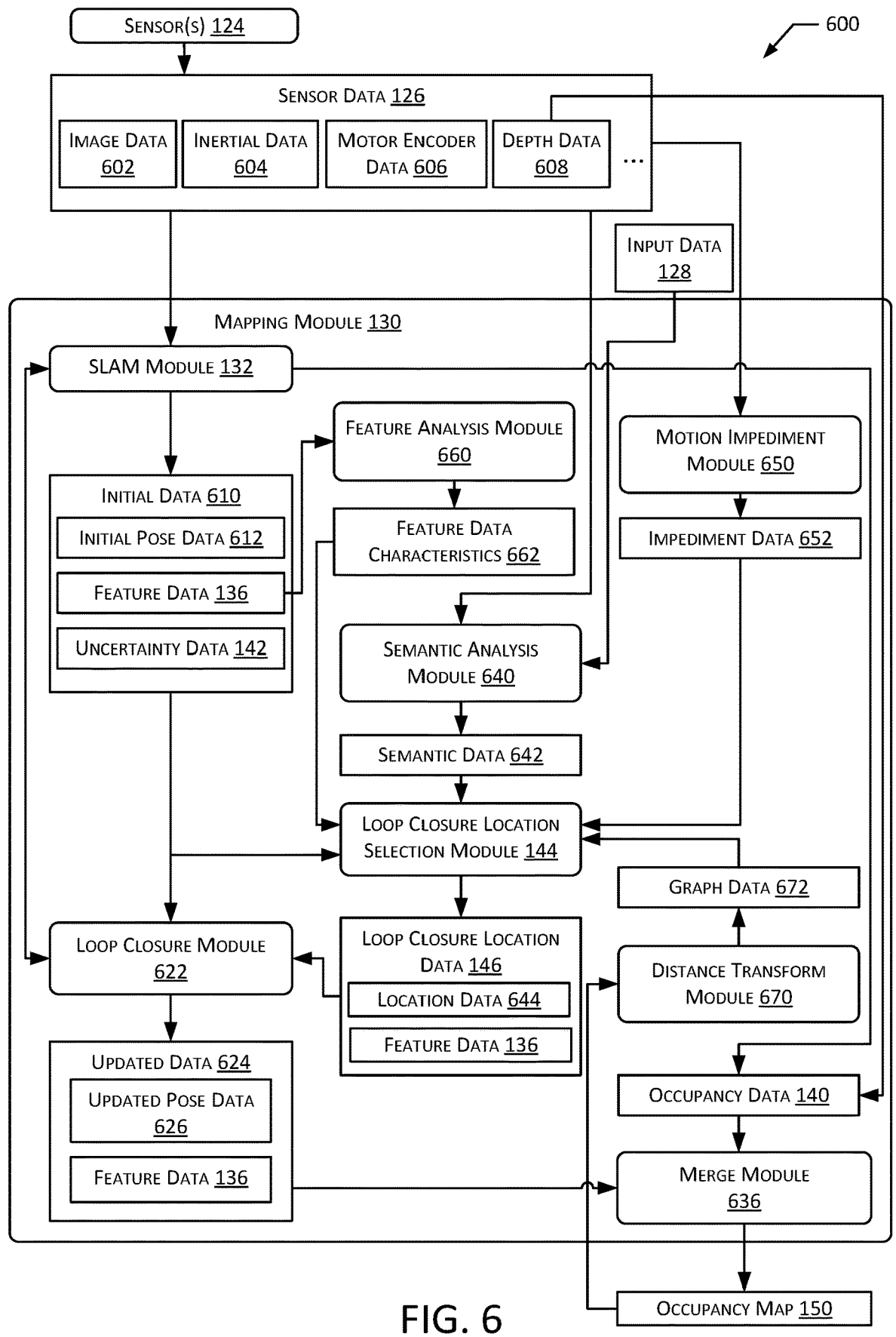
FIG. 6 illustrates a mapping module that utilizes loop closure locations to generate the occupancy map, according to some implementations.

FIG. 6 illustrates a block diagram 600 of the mapping module 130 that utilizes loop closure locations 148, according to some implementations. The loop closure locations 148 may be used during exploration to determine the occupancy map 150. In some implementations, the loop closure locations 148 and techniques described may also be used during later operation of the AMD 104. For example, if uncertainty 404 of the localization exceeds the threshold value, the AMD 104 may proceed to a loop closure location 148 and perform loop closure to improve the accuracy of the localization. In some implementations the threshold value may be determined based on factors such as one or more dimensions associated with the AMD, such as width, turning radius, maximum speed of the AMD 104, weight of the AMD 104, and so forth.

The sensors 124 on the AMD 104 provide sensor data 126. The sensor data 126 may include image data 602 acquired from one or more cameras 344. For example, a pair of red-green-blue (RGB) color cameras may be arranged on a common rigid structure to provide a stereocamera pair. The image data 602 may comprise the images produced by these cameras 344. The IMU comprising one or more gyroscopes 334 and accelerometers 336 may provide inertial data 604. For example, the IMU may be mounted to the chassis of the AMD 104, and provide inertial data 604 indicative of rotations and accelerations of the AMD 104 during movement. Motor encoder data 606 may be provided by a motor encoder 310. For example, a motor encoder 310 on the motor 116 used to rotate one of the drive wheels of the AMD 104 may provide motor encoder data 606 indicating a number and direction of rotations of the motor 116 shaft. Depth sensors such as ultrasonic sensors 318, optical sensors 320 such as a TOF depth camera, LIDAR 322, radar 360, and so forth may provide depth data 608 that is indicative of the presence or absence of obstacles in the physical space 102 within the FOV 106 of the depth sensor. For example, a sensor such as a TOF depth camera may emit a pulse of infrared light and use a detected return time for reflected light to determine a distance between the sensor and the object that reflected the light. The depth data 608 may be expressed as point cloud data, volumetric data, bearing and distance data, and so forth. The depth data 608 may be used to determine the occupancy data 140.

As described above, the mapping module 130 includes a SLAM module 132. The SLAM module 132 may accept as input the image data 602 and may also use other data such as the inertial data 604, the motor encoder data 606, and so forth. The SLAM module 132 may process the input to determine initial data 610 that may comprise initial pose data 612, feature data 136, and uncertainty data 142. The initial pose data 612 may describe the initial trajectory 172 before loop closure. The initial poses may comprise data indicative of a location and rotations with respect to one or more axes based on the input. For example, the initial poses may be expressed as a 6D set of values.

Each initial pose may be associated with feature data 136. For example, the feature data 136 may comprise information about the features determined to be present in the image data 602 associated with that pose. For example, the image data 602 associated with the pose may be processed to determine one or more features, and those features may be characterized to determine descriptors that are then stored as the feature data 136.

Each initial pose may be associated with uncertainty data 142. For example, the uncertainty data 142 is indicative of an uncertainty 404 associated with the initial pose data 612. In some implementations, the loop closure location selection module 144 may take into consideration uncertainty data 142 that is indicative of an uncertainty value for initial data 610 that is less than a threshold. For example, if the initial data 610 has initial pose data 612 indicative of a pose that has an uncertainty 404 of less than 3 cm, the loop closure location selection module 144 may deem this to be a loop closure location 148 and store the corresponding loop closure location data 146.

In some implementations a feature analysis module 660 may be used to determine feature data characteristics 662. The feature analysis module 660 may accept as input the feature data 136 associated with an initial pose and determine feature data characteristics 662. The feature data characteristics 662 may comprise data such as a count of variant features, a count of invariant features, and so forth. Operation of the feature analysis module 660 is discussed in more detail with regard to FIG. 8. The feature data characteristics 662 may be used by the loop closure location selection module 144 to determine the loop closure location data 146.

In some implementations a semantic analysis module 640 may be used to determine semantic data 642 associated with the physical space 102. The semantic analysis module 640 may accept as input the sensor data 126, the input data 128, and so forth. In some implementations the semantic analysis module 640 may comprise one or more machine learning systems, such as a neural network. Operation of the semantic analysis module 640 is discussed in more detail with regard to FIG. 9. The semantic data 642 may be used by the loop closure location selection module 144 to determine the loop closure location data 146. In some implementations, the semantic analysis module 640 may be used to determine a candidate loop closure location before the AMD 104 physically visits the location, or before acquisition of data sufficient to determine loop closure location data 146. For example, a candidate loop closure location may be determined based on semantic data 642. The AMD 104 may then be moved to the candidate loop closure location. Initial data 610 may be obtained at the candidate loop closure location and assessed to determine if it is suitable to determine loop closure location data 146.

In some implementations a distance transform module 670 may be used to determine graph data 672 associated with the physical space 102. The distance transform module 670 may implement a distance transform function to determine the graph data 672 based at least in part on the occupancy map 150, or at least the portion thereof that is available. Operation of the distance transform module 670 is discussed in more detail with regard to FIG. 9. The graph data 672 may be used by the loop closure location selection module 144 to determine the loop closure location data 146. In some implementations, the distance transform module 670 may be used to determine a candidate loop closure location before the AMD 104 physically visits the location, or before acquisition of data sufficient to determine loop closure location data 146. For example, based on a partial occupancy map 150, the distance transform module 670 may be used to determine a candidate loop closure location. The AMD 104 may then be moved to the candidate loop closure location. Initial data 610 may be obtained at the candidate loop closure location and assessed to determine if it is suitable to determine loop closure location data 146.

In other implementations, the graph data 672 determined by the distance transform module 670 may be represented in terms of a distance map, distance field, and so forth. For example, the occupancy map 150 indicative of obstacles may be processed as a bitmap image, and the graph data 672 may comprise a distance map. The distance map may comprise a bitmap image in which the intensity or grayscale value for an individual pixel is representative of a distance transform value.

In some implementations a motion impediment module 650 may be used to determine impediment data 652. The impediment data 652 may comprise information indicative of one or more impediments to mobility of the AMD 104. Operation of the motion impediment module 650 is discussed in more detail with regard to FIG. 11. The impediment data 652 may be used by the loop closure location selection module 144 to determine the loop closure location data 146. In some implementations, the motion impediment module 650 may be used to determine a candidate loop closure location before the AMD 104 physically visits the location, or before acquisition of data sufficient to determine loop closure location data 146. For example, a candidate loop closure location may be determined based on impediment data 652. The AMD 104 may then be moved to the candidate loop closure location. Initial data 610 may be obtained at the candidate loop closure location and assessed to determine if it is suitable to determine loop closure location data 146.

The loop closure location selection module 144 determines one or more loop closure locations 148 and may store the associated loop closure location data 146 for later use. The loop closure location data 146 may comprise location data 644 indicative of a physical location within the physical space 102 and feature data 136 that is associated with that loop closure location 148. Operation of the loop closure location selection module 144 is discussed in more detail with regard to FIG. 7.

During operation the SLAM module 132, or other modules, determines the occupancy data 140. The occupancy data 140 may be associated with a particular pose. For example, the occupancy data 140 may be determined from sensor data 126 acquired while the AMD 104 is at a location and orientation indicated by the initial pose data 612. The occupancy data 140 may be indicative of the location of an obstacle 110 relative to that initial pose data 612.

During operation, a loop closure module 622 is used to perform a loop closure process. For example, the loop closure module 622 may be initiated responsive to the AMD 104 moving to within a threshold distance of a loop closure location 148 as indicated by the loop closure location data 146. The loop closure process may include bundle adjustment or other functions that adjust previously stored trajectory data such as poses and determines updated data 624. The loop closure module 622 may provide output, such as updated data 624.

The updated data 624 may include updated pose data 626 that is based on the initial pose data 612. The feature data 136 associated with the updated pose data 626 may be retained. For example, a first initial pose may have a first location indicated with respect to the various features observed in the image data 602. After the loop closure, the updated initial pose may indicate a second location that is in a slightly different location with respect to the same various features. The loop closure module 622 attempts to resolve the drift that is present in the initial trajectory 172 by assuming that at least a minimum number of the same set of features are observed, the AMD 104 must be back in the same location, and given that most of the features have not moved, any discrepancy in the location is due to other error. The updated data 624 describes the trajectory 112.

The updated data 624 and the associated occupancy data 140 may be used by a merge module 636 to determine the occupancy map 150. For example, given the updated pose data 626 resulting from the loop closure process, the occupancy data 140 associated with those poses may be used to construct the occupancy map 150.

In some implementations, data from the mapping module 130 may be used to determine training data. The training data may be used to train a machine learning system to determine loop closure locations 148. The training data may comprise at least a portion of the loop closure location data 146 and data indicative of success of the loop closure module 622 to complete a loop closure process using the loop closure location data 146. For example, the training data may comprise a subset of the loop closure location data 146. The training data may be used to train a machine learning system, such as a neural network. During subsequent operation, the neural network may be used by the loop closure location selection module 144. For example, the loop closure location selection module 144 may process the initial data 610 to determine if the initial data 610 is likely to be suitable for use as a loop closure location 148. If so, the loop closure location data 146 is generated. In other implementations, the training data may include other information as well. For example, the training data may comprise semantic data 642, impediment data 652, graph data 672, and so forth.

Figure 7:
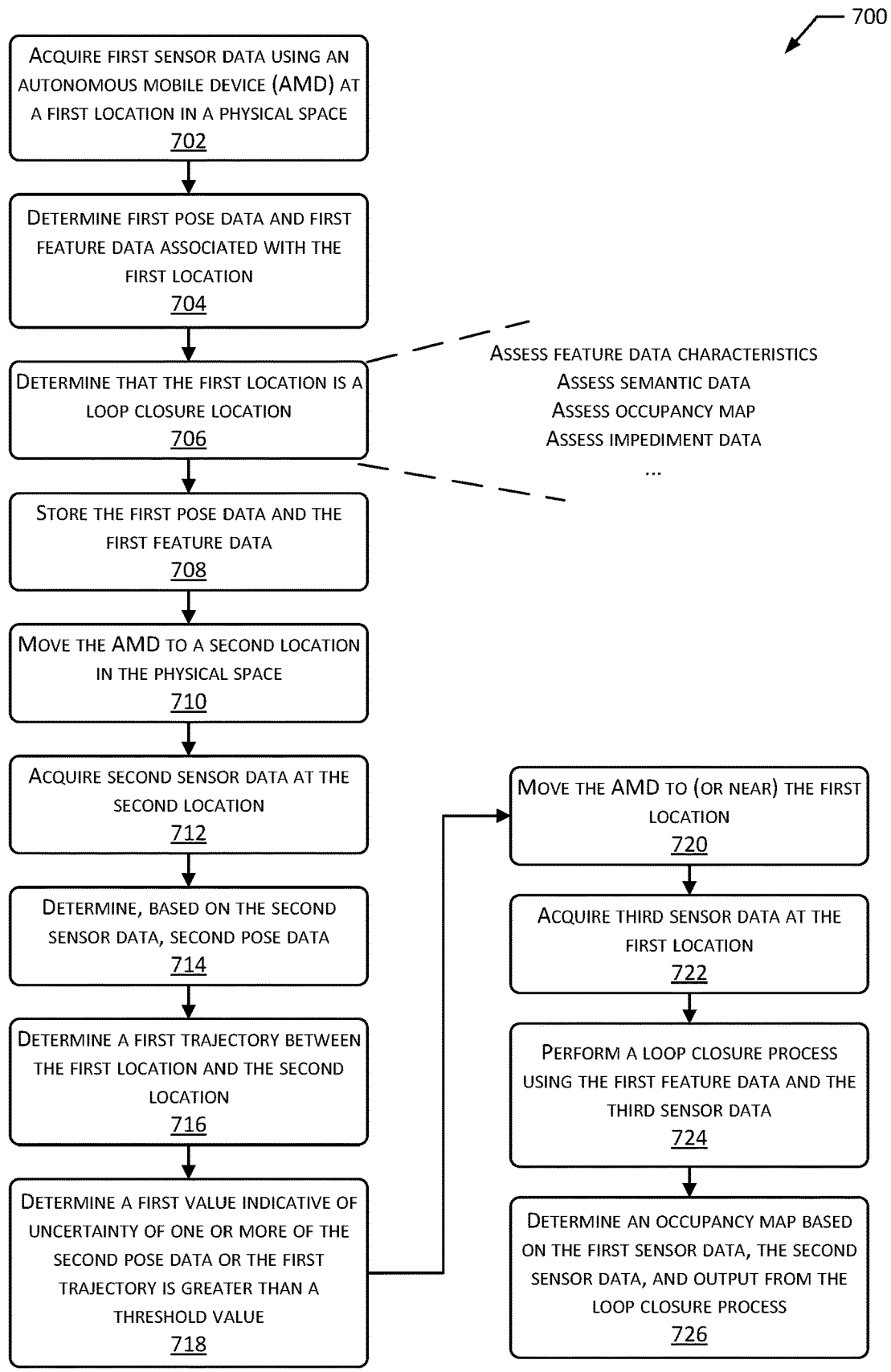
FIG. 7 is a flow diagram of a process for generating an occupancy map using a loop closure location, according to some implementations.

FIG. 7 is a flow diagram 700 of a process for generating an occupancy map 150 using a loop closure location 148, according to some implementations. The process may be implemented at least in part by one or more of the AMD 104, the docking station 108, a server 170, or other device 176.

At 702 first sensor data 126(1) is acquired by the AMD 104 at a first location in a physical space 102. For example, the AMD 104 may use one or more sensors 124 to acquire sensor data 126. The AMD 104 may have moved to the first location autonomously. For example, during exploration the autonomous navigation module 164 may direct the AMD 104 through the physical space 102.

At 704, first pose data 134(1) and first feature data 136(1) associated with the first location is determined. For example, initial pose data 612(1) and feature data 136(1) are determined by processing the first sensor data 126(1) using the SLAM module 132. The feature data 136 may comprise a set of descriptors indicative of one or more features in the physical space 102 that are represented in the sensor data 126. For example, the image data 602 may be processed to determine descriptors that are representative of features that are visible in the physical space 102.

At 706, the first location is determined to be a loop closure location 148. One or more techniques may be used to determine if the first location is suitable for designation as a loop closure location 148. The techniques may include one or more of assessing feature data characteristics 662, assessing semantic data 642, assessing the occupancy map 150, assessing the impediment data 652, and so forth. These techniques are discussed in more detail with regards to FIGS. 8-11. These techniques may be used alone, or in combination with one another.

In some implementations the loop closure location 148 may be determined before the AMD 104 visits that location. For example, a partial or full occupancy map 150 may be processed to determine a candidate loop closure location before the AMD 104 moves to that location. A candidate loop closure location may comprise a loop closure location 148 that the AMD 104 has not yet visited. The AMD 104 may move to the candidate loop closure location and acquire sensor data used to determine the feature data 136. In one implementation, the designation of the candidate loop closure location as a loop closure location 148 may be based on an assessment of the feature data characteristics 662 corresponding to the feature data 136 associated with the candidate loop closure location. For example, if the feature data characteristics 662 suggest sufficient invariant features suitable for loop closure, the candidate loop closure location may be designated as a loop closure location 148.

In some implementations, the loop closure location 148 determination may be based at least in part on a value indicative of uncertainty 404 in pose data 134 being less than a threshold value. For example, if the initial data 610 has initial pose data 612 indicative of a pose with uncertainty data 142 indicating an uncertainty value of less than the threshold value, the first location may be deemed to be a loop closure location 148. The threshold value may be determined based on factors such as one or more dimensions associated with the AMD 104, such as width, turning radius, maximum speed of the AMD 104, weight of the AMD 104, and so forth.

In some implementations, responsive to the determination that the first location is a loop closure location 148, the AMD 104 may perform one or more movements of at least a portion of the AMD 104. The one or more movements move the sensor FOV 106 of a sensor 124 of the AMD 104 to view different portions of the physical space 102. For example, the AMD 104 may perform a spiral movement, or rotate 360 degrees turning a full circle, to acquire a panorama of sensor data 126 from all directions. In other implementations, other movements may be performed. For example, the AMD 104 may move along a path that describes an equilateral triangle that is centered on the loop closure location 148, or where one of the vertices of the equilateral triangle is the loop closure location 148.

The loop closure location 148 may be determined based on the presence of feature data 136 that is considered invariant over time. For example, a first descriptor that is associated with a first feature of the physical space 102 may be determined based on the first sensor data 126 acquired at a first time. A second descriptor that is associated with the first feature of the physical space 102 may be determined based on the first sensor data 126 acquired at a second time. A difference between the first descriptor and the second descriptor may be determined. For example, the first descriptor may comprise a first vector in a vector space and the second descriptor may comprise a second vector in the vector space. The difference may be determined by subtracting the first vector from the sector vector. If the difference is less than a threshold value, the feature associated with one or more of the first descriptor or the second descriptor may be deemed to be associated with an invariant feature. In some implementations the first time and the second time may be separated by seconds, minutes, hours, or days.

At 708 loop closure location data 146 is stored. For example, the first feature data 136 and the associated location data 644 are stored. In some implementations the loop closure location data 146 may comprise pose data 134. For example, the initial pose data 612 may be used.

At 710, the AMD 104 moves to a second location in the physical space 102. For example, the autonomous navigation module 164 may direct the AMD 104 through the physical space 102.

At 712, second sensor data 126(2) is acquired by the AMD 104 at the second location in a physical space 102.

At 714, second pose data 134(2) is determined based on the second sensor data 126(2). For example, initial pose data 612(2) and feature data 136(2) are determined by processing the second sensor data 126(2) using the SLAM module 132.

In some implementations, at 716 a first trajectory may be determined between the first location and the second location. For example, the initial trajectory 172 may be determined based on the initial pose data 612 acquired while the AMD 104 moved from the first location to the second location.

At 718, a first value indicative of uncertainty 404 of one or more of the second pose data 134(2) or the first trajectory is determined to be greater than a threshold value. For example, the SLAM module 132 may provide uncertainty data 142 indicative of an uncertainty value that is greater than a threshold value. The threshold value may be determined based on factors such as one or more dimensions associated with the AMD, such as width, turning radius, maximum speed of the AMD 104, weight of the AMD 104, operation of the system 100, manual entry, characteristics of the physical space 102, and so forth. For example, if the AMD 104 is determined to be within a constrained space, such as a narrow hallway, the threshold value may be less than when the AMD 104 is determined to be within a large open room with no obstacles 110 within a specified distance.

At 720, responsive to the determination that the uncertainty value is greater than the threshold value, the AMD 104 determines a loop closure location 148 as indicated in the loop closure location data 146 and moves to that loop closure location 148. In one implementation, the loop closure location 148 that is closest to a current location of the AMD 104 may be selected. In other implementations, other criteria may be used to select a loop closure location 148 from a set of loop closure locations 148. For example, the most recently determined loop closure location 148 may be selected. In another implementation, the loop closure location 148 may be detected based on a score indicative of a likelihood for a loop closure process to be successful. For example, the score may be determined based on a machine learning system that has been trained to evaluate loop closure location data 146. In yet another implementation, the loop closure location 148 may be selected based on success or failure of that loop closure location 148 during previous loop closure processing. For example, a loop closure location 148 that is associated with a subsequent failure to result in loop closure may be disregarded from further use.

In this illustration, the AMD 104 moves to the first location, or near that first location, that corresponds to the selected loop closure location 148.

The AMD 104 attempts to return to the first location in the physical space 102 but may not have returned to the exact same spot in the physical space 102 it previously occupied and designated as the first location. For example, due to the accumulated uncertainty, the AMD 104 may move to a location that is near the first location in the physical space 102. Depending on various factors, the actual location that the AMD 104 has moved to may be within centimeters or meters of the first location in the physical space 102. For example, the accrued localization uncertainty of the SLAM module 132 may result in the AMD 104 returning to an actual location that differs by some uncertainty 404 from the first location. However, the actual location to which the AMD 104 has returned is close enough to the first location in the physical space 102 that the AMD 104 is able to acquire sufficient sensor data 126 to find enough features as stored in the first feature data 136 to perform the loop closure process.

At 722, third sensor data 126(3) is acquired by the AMD 104 at or near the first location in the physical space 102. At 724, a loop closure process is performed using the first feature data 136(1) stored as the loop closure location data 146 and the third sensor data 126(3). After loop closure, uncertainty 404 with regard to the localization of the loop closure location 148 may be reduced but is not necessarily zero. After loop closure, uncertainty 404 may be reduced to 2 cm. In some implementations, the process may be iterated. For example, after loop closure and subsequent reduction in uncertainty 404, the AMD 104 may attempt to move to another loop closure location 148, such as the first location or another loop closure location.

The AMD 104 may remain at the loop closure location 148 and perform the loop closure process until one or more of the uncertainty value is below a threshold value, until no further decrease in uncertainty value is obtained, until a time limit expires, or other conditions. For example, the AMD 104 may move to different poses at or near the loop closure location 148 and continue to gather sensor data 126 until the uncertainty values for successive loop closures remains the same or exhibits a relatively small change. After the loop closure process is completed, uncertainty in the location by the SLAM module 132 may be reduced but is not necessarily zero.

In some implementations, different uncertainty threshold values may be used to determine when the AMD 104 proceeds to a loop closure location 148 and when the AMD 104 departs the loop closure location 148. Comparison of a current uncertainty value indicated by the uncertainty data 142 to a first uncertainty threshold may be used to determine when the AMD 104 should move to a loop closure location 148. Comparison of a current uncertainty value indicated by the uncertainty data 142 to a second uncertainty threshold may be used to determine when the AMD 104 may depart from the loop closure location 148. The first uncertainty threshold may be greater than the second uncertainty threshold. For example, once at a loop closure location 148, the AMD 104 may remain until the uncertainty data 142 indicates a second uncertainty value that is less than the second uncertainty threshold. While remaining at or near the loop closure location 148, the AMD 104 may change poses or otherwise move to acquire sensor data 126.

The use of a first uncertainty threshold and a second uncertainty threshold improves performance in some situations. For example, by having the second uncertainty threshold less than the first uncertainty threshold, as the AMD 104 exits the loop closure location 148 with less uncertainty than that which triggered the movement to the loop closure location 148. In effect, this provides an additional reserve of certainty, increasing a reserve of uncertainty that can be tolerated during subsequent movement.

The uncertainty thresholds may be determined based on one or more factors. In one implementation, the uncertainty thresholds may be proportionate to a distance from an origin. For example, as a geometric distance from the docking station 108 increases, the first uncertainty threshold may decrease. In another implementation, time between successive use of loop closure locations 148 may be used to specify the uncertainty thresholds. For example, frequent loop closures as indicated by the time between successive use of loop closure locations 148 being less than a threshold value, may result in a decrease in the second uncertainty threshold.

In some implementations the use of the loop closure location 148 may be opportunistic. For example, instead of the first value being greater than the threshold value as discussed at 718, if the AMD 104 is within a threshold distance of a loop closure location 148 the AMD 104 may perform the loop closure process. Continuing the example, if the loop closure location 148 is within 10 centimeters of a planned path of the AMD 104 to a destination, the AMD 104 may perform a loop closure process at the loop closure location 148 before continuing on to destination. In this example, the uncertainty data 142 did not indicate an uncertainty value that was greater than the threshold value, but the performance of the loop closure process subsequently reduced the uncertainty value of the localization before the AMD 104 continued on its way to a destination.

At 726 an occupancy map 150 is determined based on the first sensor data 136(1), the second sensor data 136(2), and output from the loop closure process. For example, the merge module 636 may use the occupancy data 140 and the updated data 624 to determine the occupancy map 150. In another example, the merge module 636 may update or modify an existing occupancy map 150.

Figure 8:
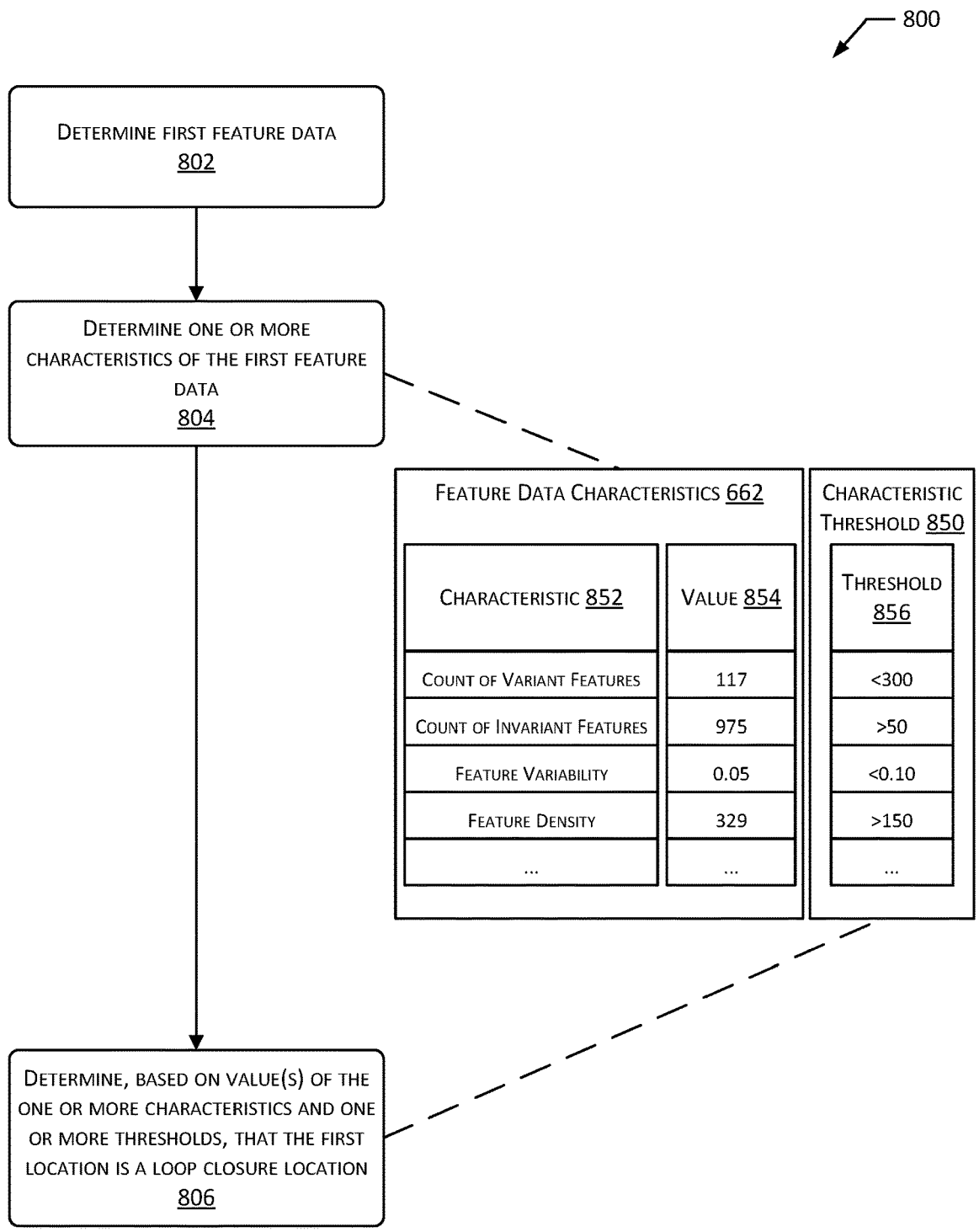
FIG. 8 is a flow diagram of a process for determining a loop closure location based at least in part on feature data, according to some implementations.

FIG. 8 is a flow diagram 800 of a process for determining a loop closure location 148 based at least in part on feature data 136, according to some implementations. The process may be implemented at least in part by one or more of the AMD 104, the docking station 108, a server 170, or other device 176. For example, at least a portion of this process may be implemented by one or more of the loop closure location selection module 144, the feature analysis module 660, and so forth.

At 802, first feature data 136 is determined while the AMD 104 is at a first location. For example, the SLAM module 132 may generate the feature data 136 that is associated with initial pose data 612.

At 804, one or more characteristics of the first feature data 136 are determined. In one implementation, the feature analysis module 660 may accept the first feature data 136 as input and determine feature data characteristics 662. The feature data characteristics 662 are indicative of one or more characteristics 852 and associated values 854 of the first feature data 136. The feature data characteristics 662 may comprise a count of features in the first feature data 136. The feature data characteristics 662 may comprise a count of variant features in the first feature data 136. For example, these may be features that are determined to change over time. The feature data characteristics 662 may comprise a count of invariant features in the first feature data 136. For example, these may be features that are determined to be stable or unchanging over time. The feature data characteristics 662 may comprise a feature variability metric. For example, the feature variability metric may be indicative of a percentage or fraction of features per unit of solid angle, such as a steradian, that are invariant. The feature data characteristics 662 may comprise a feature density of features in the first feature data 136. For example, the feature density may indicate the number of features present per unit of solid angle, such as a steradian.

The values 854 associated with the feature data characteristics 662 may be compared with associated characteristics thresholds 850 to determine whether the feature data 136 is suitable for use as a loop closure location 148. For example, the threshold 856 may specify that a count of more than 50 invariant features is needed to designate the loop closure location 148. The thresholds 856 may specify minima, maxima, ranges, and so forth. The thresholds 856 may be static or dynamically adjusted. For example, if the AMD 104 is determined to be within a constrained space, such as a narrow hallway, one or more of the thresholds 856 may be less than when the AMD 104 is determined to be within a large open room with no obstacles 110 within a specified distance.

At 806, based on value(s) 854 of the one or more characteristics 852 and the associated one or more thresholds 856, the first location that is associated with the first feature data 136 may be determined to be a loop closure location 148. For example, the first location may be determined to be a loop closure location 148 when the first feature data 136 is associated with a first count of features that exceeds a threshold 856 value.

FIG. 9 is a flow diagram 900 of a process for determining a loop closure location 148 based at least in part on a graph generated using a distance transform function, according to some implementations. The process may be implemented at least in part by one or more of the AMD 104, the docking station 108, a server 170, or other device 176. For example, at least a portion of this process may be implemented by one or more of the loop closure location selection module 144, the distance transform module 670, and so forth.

At 902 an occupancy map 150 is determined for at least a portion of the physical space 102. For example, as the AMD 104 moves and generates occupancy data 140, the occupancy map 150 may be generated. The occupancy map 150 may be incomplete in that it does not include the entirety of the physical space 102, such as a home or office. An example of the partial occupancy map 150(1) is depicted.

At 904, the occupancy map 150 is processed using a distance transform function to determine a first graph 910. The distance transform function produces an array of data comprising distance transform values that are indicative of a minimum distance between a point of the first graph 910, such as a set of coordinates of the occupancy map 150, and an obstacle 110 indicated by the occupancy map 150. Each point of the first graph 910 is a point that is equidistant from all closest obstacles that are indicated by the occupancy map 150. For example, the closest obstacles 110 are those that are within an unobstructed line of sight of the AMD 104, and not obstacles that are beyond a wall and in another room. The distance calculated may be Euclidean, rectilinear or "taxicab", Chebyshev distance, and so forth. In one implementation, the distance transform function may be implemented using the code available at "github.com/scijs/distance-transform". In one implementation, the array of data produced by the distance transform function may comprise a grayscale bitmap. The array of data resulting from the distance transform function may be processed with one or more morphological operators to produce a morphological skeleton that is used as the graph 910. For example, the distance transform function may produce as output a bitmap that is processed using one or more morphological operators, such as dilation and erosion to produce the morphological skeleton. The points on the morphological skeleton comprise points that are at a maximum distance from the obstacles 110.

The graph 910 may be visualized as a "skeleton" that overlays the occupancy map 150. The graph 910 may comprise a plurality of vertices 912 that are joined to one another by edges 914. A terminal vertex 916 is a vertex that is at an endpoint of the graph 910. For example, a terminal vertex 916 may comprise a vertex 912 that is only connected to a single edge 914.

The representation of the physical space 102 provided by the graph 910 is useful in determining loop closure locations 148. The loop closure location 148 may be determined based on a count of edges 914 associated with a vertex 912. For example, a vertex 912 connected to one edge 914 would be a terminal vertex 916. This may occur in a corner of a room. Terminal vertices 916 may be designated as loop closure locations 148. In another example, a vertex 912 connected to three edges 914 may occur at an intersection of three or more passageways. A vertex 912 with three or more edges 914 may be designated as a loop closure location 148. In some implementations, locations coincident with points on the graph 910 may be designated as loop closure points 148. For example, points on the graph 910 represent locations that are farthest from obstacles 110. This provides space for the AMD 104 to move and reduces the likelihood that uncertainty 404 from the SLAM module 132 would result in the AMD 104 ending up in a location where it is unable to move.

At 906 the loop closure location 148 is determined based on one or more of the information associated with the graph 910. The loop closure location 148 may be determined by one or more of a vertex 912, a terminal vertex 916, or a distance transform value associated with a point on the graph 910. In one implementation, a distance transform value associated with a point may be used to determine a loop closure location 148. The distance transform value as produced from the distance transform function provides a value that is indicative of a distance between the point and a closest obstacle 110. This information may be used to determine if the point is associated with a constrained region. This constrained region, such as a narrow hallway, may introduce limitations into the movement of the AMD 104. If the distance transform value for a point is less than a threshold value, that point may be designated as a loop closure location 148.

In some implementations, a candidate loop closure location may be determined before the AMD 104 physically visits that location. For example, based on a partial occupancy map 150, the distance transform module 670 may be used to determine the graph 910. The graph 910 may be analyzed to determine a candidate loop closure location. The AMD 104 may then be moved to the candidate loop closure location. Initial data 610 may be obtained at the candidate loop closure location and assessed to determine if it is suitable to determine loop closure location data 146. If yes, the candidate loop closure location may be designated as a loop closure location 148.

In another implementation, the AMD 104 may have visited the candidate loop closure location previously. During the previous visit, the AMD 104 may not have stored initial data 610. Responsive to the analysis of the graph 910, the AMD 104 may return to the candidate loop closure location. Once returned, the AMD 104 may determine if the initial data 610 obtained at the candidate loop closure location is suitable to determine loop closure location data 146. If yes, the candidate loop closure location may be designated as a loop closure location 148.

Figure 10:
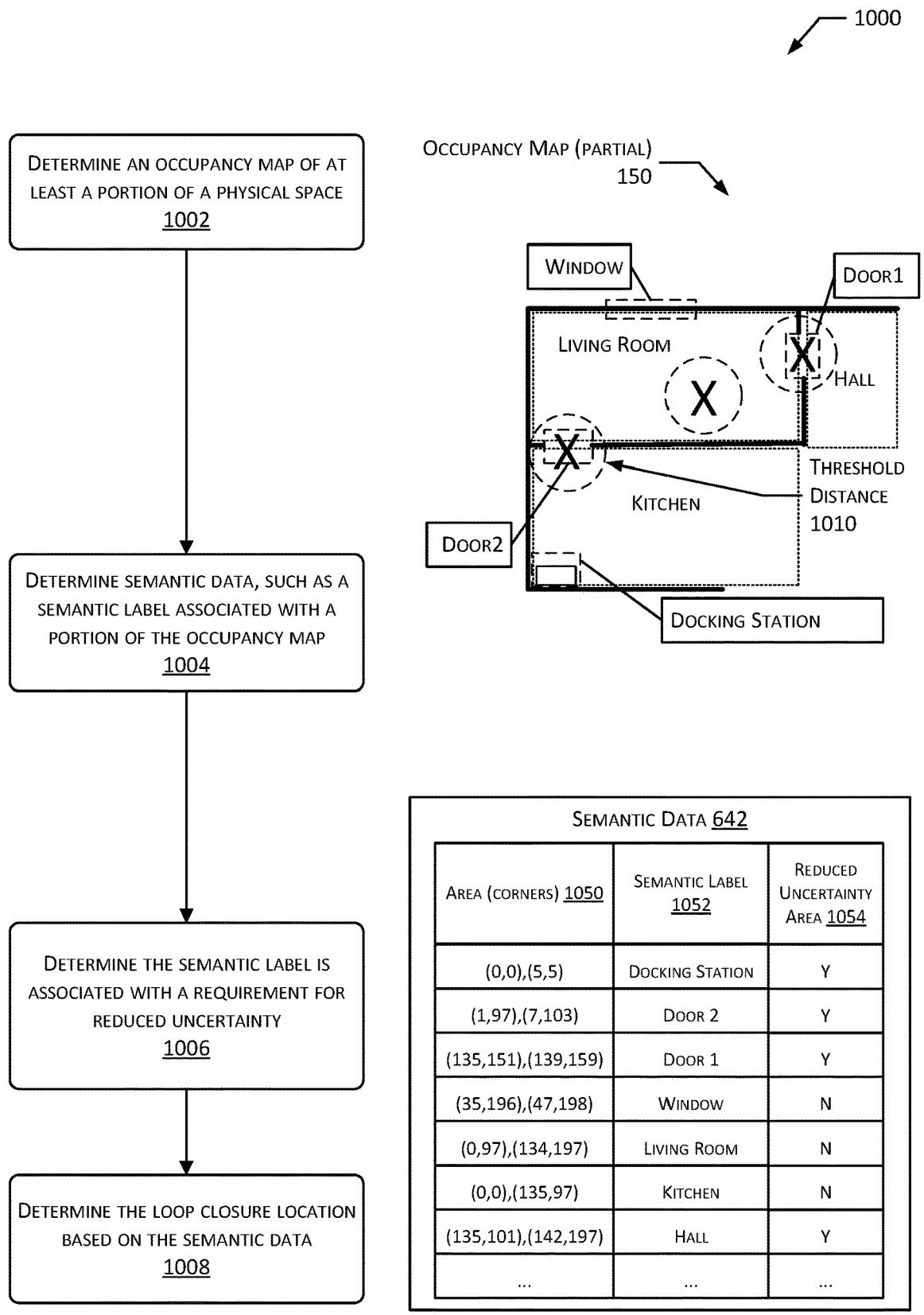
FIG. 10 is a flow diagram of a process for determining a loop closure location based at least in part on semantic data, according to some implementations.

FIG. 10 is a flow diagram 1000 of a process for determining a loop closure location 148 based at least in part on semantic data 642, according to some implementations. The process may be implemented at least in part by one or more of the AMD 104, the docking station 108, a server 170, or other device 176. For example, at least a portion of this process may be implemented by one or more of the loop closure location selection module 144, the semantic analysis module 640, and so forth.

At 1002 an occupancy map 150 is determined of at least a portion of the physical space 102. For example, as the AMD 104 moves and generates occupancy data 140, the occupancy map 150 may be generated. The occupancy map 150 may be incomplete in that it does not include the entirety of the physical space 102, such as a home or office. An example of the partial occupancy map 150 is depicted. At 1004 the semantic data 642 is determined that is associated with a portion of the occupancy map 150. The semantic data 642 may comprise one or more of information indicative of an area 1050 or location in the physical space 102, a semantic label 1052, information indicative of a reduced uncertainty area 1054, or other information. For example, the semantic label 1052 may be indicative of a type of obstacle 110 or feature of the physical space 102. The area 1050 or location provides an indication of the portion of the physical space 102 that the semantic label 1052 is associated with. In one implementation, a predetermined set of semantic labels 1052 may be determined that comprises those semantic labels 1052 that are associated with a "yes" or equivalent value in the reduced uncertainty area 1054.

The semantic data 642 may be determined based on output from a semantic analysis module 640 or other system. For example, the semantic analysis module 640 may comprise one or more machine learning systems, such as a neural network, that has been trained to perform object recognition and generate semantic labels 1052 based on image data 602. Continuing the example, the semantic analysis module 640 may process the image data 602 and determine that the object depicted in the image data 602 is "door", "window", "dog bed", "docking station", and so forth.

The semantic data 642 indicates a portion of the occupancy map 150, such as an area 1050 in the occupancy map 150 that corresponds to the physical space 102, that the semantic label 1052 is associated with. For example, if the semantic label 1052 designates a room, the area 1050 may encompass the entire room. In comparison, if the semantic label 1052 designates an object in a room, such as a chair, the area 1050 may be indicative of the space occupied by the object.

In some implementations at least a portion of the semantic data 642 may be determined based at least in part on input data 128. For example, the user of the AMD 104 may touch an object and say aloud the label for that object. The AMD 104 may use this information to associate that semantic label 1052 with the object.

The semantic data 642 may be used to disqualify some locations from use as loop closure locations 148. For example, a location that has a sensor FOV 106 that is directed towards an area 1050 associated with a semantic label 1052 of "window", "plant", "television", "office chair" and so forth may be removed from consideration as a loop closure location 148. This prevents loop closure locations 148 from being selected that would provide inconsistent or otherwise invariant features that would impair the loop closure process. This may include features that are visible outside a boundary of the physical space 102, such as through the window or as presented on a television screen, moveable objects that may change position such as an office chair, and so forth.

At 1006 a determination is made as to whether the semantic label 1052 is associated with a requirement for reduced uncertainty 404. The semantic data 642 may include the information indicative of a reduced uncertainty area 1054. Some semantic labels 1052 may be associated with a requirement for greater accuracy in localization. For example, a semantic label 1052 associated with the semantic label 1052 of "door" may be associated with an area of reduced uncertainty 404. Poor accuracy could result in the AMD 104 being unable to pass through the door, blocking the door, or other undesirable behaviors. Within a reduced uncertainty area 1054, the AMD 104 may be constrained due to physical constraints, possible movement of others in the physical space 102, and so forth.

Within the reduced uncertainty area 1054, the AMD 104 may operate the mapping module 130 to maintain uncertainty 404 in localization to values that are below a threshold specified for those reduced uncertainty areas 1054. For example, within the reduced uncertainty area 1054, the AMD 104 may return more frequently to a loop closure location 148 to perform the loop closure process.

The determination as to whether a particular semantic label 1052 is associated with a reduced uncertainty area 1054 may be based on input data 128, data from the other techniques mentioned in this disclosure, and so forth. For example, if a distance transform value that is less than a threshold value is within an area 1050, the area 1050 and corresponding semantic label 1052 may be designated as a reduced uncertainty area 1054. In one implementation, the threshold value may be based on one or more dimensions associated with the AMD 104. For example, if the AMD 104 has a turning radius of 56 cm, the threshold value may be one half of a sum of the turning radius and a margin of error such as 10 cm. Continuing the example, the threshold value may be 33 cm. A point in the physical space 102 having a distance transform value of 33 cm or less would be a relatively tight fit for the AMD 104 to move, and so would be designated as a reduced uncertainty area 1054.

At 1008, the loop closure location 148 is determined based at least in part on the semantic data 642. For example, the semantic label 1052 "door" may be associated with a reduced uncertainty area 1054. The loop closure location selection module 144 may use initial data 610 resulting from sensor data 126 acquired while within the area 1050 or within a threshold distance 1010 of the area 1050. The threshold distance 1010 allows for the loop closure location selection module 144 to take into consideration the semantic data 642 at some distance. The threshold distance 1010 may be static or dynamically determined. For example, the location in the physical space 102 may be designated as a loop closure location 148 if that location is within the area 1050 that is associated with the semantic label 1052 or is within the threshold distance 1010.

In some implementations, a candidate loop closure location may be determined before the AMD 104 physically visits that location, based on the semantic data 642. For example, the semantic data 642 may indicate "door". As a result, a candidate loop closure location may be determined relative to the door. The AMD 104 may then be moved to the candidate loop closure location. Initial data 610 may be obtained at the candidate loop closure location and assessed to determine if it is suitable to determine loop closure location data 146. If yes, the candidate loop closure location may be designated as a loop closure location 148.

In another implementation, the AMD 104 may have visited the candidate loop closure location previously. During the previous visit, the AMD 104 may not have stored initial data 610. Responsive to the analysis of the semantic data 642, the AMD 104 may return to the candidate loop closure location. Once returned, the AMD 104 may determine if the initial data 610 obtained at the candidate loop closure location is suitable to determine loop closure location data 146. If yes, the candidate loop closure location may be designated as a loop closure location 148.

Figure 11:
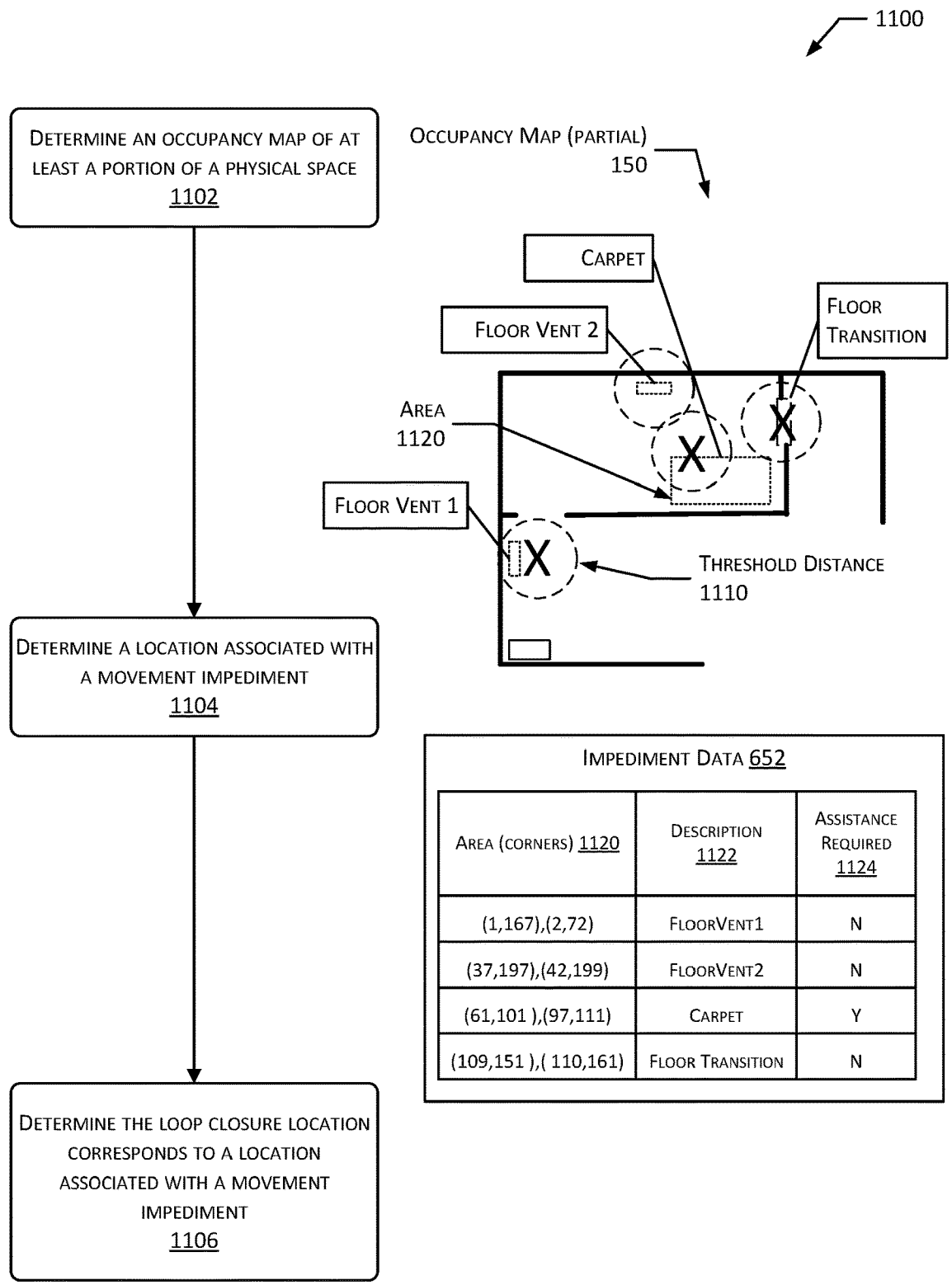
FIG. 11 is a flow diagram of a process for determining a loop closure location based at least in part on impediment data, according to some implementations.

FIG. 11 is a flow diagram 1100 of a process for determining a loop closure location 148 based at least in part on impediment data 652, according to some implementations. The process may be implemented at least in part by one or more of the AMD 104, the docking station 108, a server 170, or other device 176. For example, at least a portion of this process may be implemented by one or more of the loop closure location selection module 144, the motion impediment module 650, and so forth.

At 1102 an occupancy map 150 is determined of at least a portion of the physical space 102. For example, as the AMD 104 moves and generates occupancy data 140, the occupancy map 150 may be generated. The occupancy map 150 may be incomplete in that it does not include the entirety of the physical space 102, such as a home or office. An example of the partial occupancy map 150 is depicted.

The motion impediment module 650 may determine the impediment data 652. The impediment data 652 may comprise information indicative of one or more impediments to mobility of the AMD 104. An impediment may comprise an object, architectural or structural feature, or actor that impairs the movement of the AMD 104. This impairment may include, but is not limited to, the AMD 104 moving more slowly than expected, the AMD 104 moving faster than expected, the AMD 104 becoming stuck and unable to move without external assistance, unreliable sensor data 126 that adversely affects operation, and so forth. For example, an impediment may comprise a thick carpet that fouls the wheels of the AMD 104. In another example, an impediment may comprise a floor transition or bump. In another example, the impediment may comprise a floor vent or ventilation grate that could trap a wheel of the AMD 104. In another example, an impediment may comprise a pet such as a large dog that persistently attempts to interact with the AMD 104.

At 1104 impediment data 652 indicative of a location associated with a movement impediment is determined. The location may be determined by the SLAM module 132. The determination of an impediment may be based on sensor data 126, output from one or more modules, or a combination thereof. The impediment data 652 may include an area 1120 or location that is indicative of a portion of the physical space 102 that the impediment is associated with. The impediment data 652 may include a description 1122 that is representative of the nature of the impediment. In some implementations the description 1122 may comprise a semantic label 1052. The impediment data 652 may also include data indicative of whether the AMD 104 required assistance 1124 to move or perform another task.

An impediment at the location may be determined if the AMD 104 experiences a tilt greater than a first threshold value. The first threshold value may be determined based on testing to determine an upset angle indicative of a tilt at which the AMD 104 topples. A tilt may occur due to movement across a flooring transition or other abrupt change in elevation of a flooring surface, movement along a ramp, an external actor such as a dog leaning on the AMD 104, and so forth.

An impediment at the location may be determined if the AMD 104 experiences an acceleration greater than a second threshold value. For example, greater acceleration may occur if the AMD 104 is being pushed along by an external actor, or if the AMD 104 is moving down a ramp. In some implementations an acceleration less than a specified threshold may also be indicative of an impediment. For example, if the AMD 104 is commanded to move but the actual acceleration as measured by an accelerometer is not within the specified threshold, that location may be associated with an impediment. The second threshold value may be determined based on capabilities of the motors 116 and factors such as the weight of the AMD 104. For example, the second threshold value may be determined as a maximum acceleration possible based on the capabilities of the motors 116 and the weight of the AMD 104 on a flat and dry surface.

An impediment at the location may be determined if the AMD 104 required external assistance. For example, the AMD 104 may require external assistance if the AMD 104 has become immobilized due to motor fouling, become physically entrapped, uncertainty 404 of the localization exceeds a minimum threshold needed for autonomous navigation, and so forth. In some implementations the AMD 104 may signal for assistance. For example, the AMD 104 may use a text to speech system to present synthesized speech requesting help, may present a sound associated with a request for assistance, present output on a display device, send an electronic message, and so forth. In some implementations the assistance may be rendered without request by the AMD 104. For example, a user may command the AMD 104 to stop movement, and may perform a corrective action such as physically moving the AMD 104, directing the AMD 104 to move in a specified fashion, and so forth.

Because an impediment may result in the AMD 104 being unable to move or perform another task, a reduction in the uncertainty 404 of the localization near these impediments is useful. For example, by reducing the uncertainty 404 in the localization near the carpet, the AMD 104 is able to navigate more closely to the carpet without driving over the carpet and fouling the wheels.

At 1106 a loop closure location 148 is determined that corresponds to a location associated with a movement impediment. The location designated as the loop closure location 148 may be within the area 1120. For example, a loop closure location 148 may be determined for a pose that is within the area 1120 designated as an impediment that did not require assistance 1124. Continuing the example, the loop closure location 148 may be located within an area 1120 that includes a floor transition.

The location designated as the loop closure location 148 may be offset from the impediment, and outside the area 1120. For example, a loop closure location 148 may be determined for a pose that is within a threshold distance 1110 of the area 1120 designated as an impediment for which assistance was required 1124, but outside the area 1120. The threshold distance 1110 may be measured from a center of the area 1120 associated with the impediment, a boundary or edge of the area 1120, a corner of the area 1120, and so forth. By determining a loop closure location 148 that is within the threshold distance 1110, but not within the area 1120, the AMD 104 avoids future entrapment while still acquiring the additional loop closure location data 146 used to reduce uncertainty 404 during later operation of the SLAM module 132.

In some implementations, a candidate loop closure location may be determined before the AMD 104 physically visits that location, based on the impediment data 652. For example, the impediment data 652 may indicate "floor vent". As a result, a candidate loop closure location may be determined relative to the "floor vent". The AMD 104 may then be moved to the candidate loop closure location. Initial data 610 may be obtained at the candidate loop closure location and assessed to determine if it is suitable to determine loop closure location data 146. If yes, the candidate loop closure location may be designated as a loop closure location 148.

In another implementation, the AMD 104 may have visited the candidate loop closure location previously. During the previous visit, the AMD 104 may not have stored initial data 610. Responsive to the analysis of the semantic data 642, the AMD 104 may return to the candidate loop closure location. Once returned, the AMD 104 may determine if the initial data 610 obtained at the candidate loop closure location is suitable to determine loop closure location data 146. If yes, the candidate loop closure location may be designated as a loop closure location 148.

The various techniques described within respect to FIGS. 8-11 may be used individually or in various combinations to determine one or more loop closure locations 148. For example, a loop closure location 148 may be determined as a vertex 912 on the graph 910 that is within a threshold distance 1110 of an impediment and is associated with feature data 136 having a count of invariant features that exceeds the characteristic threshold 850.

Figure 12:
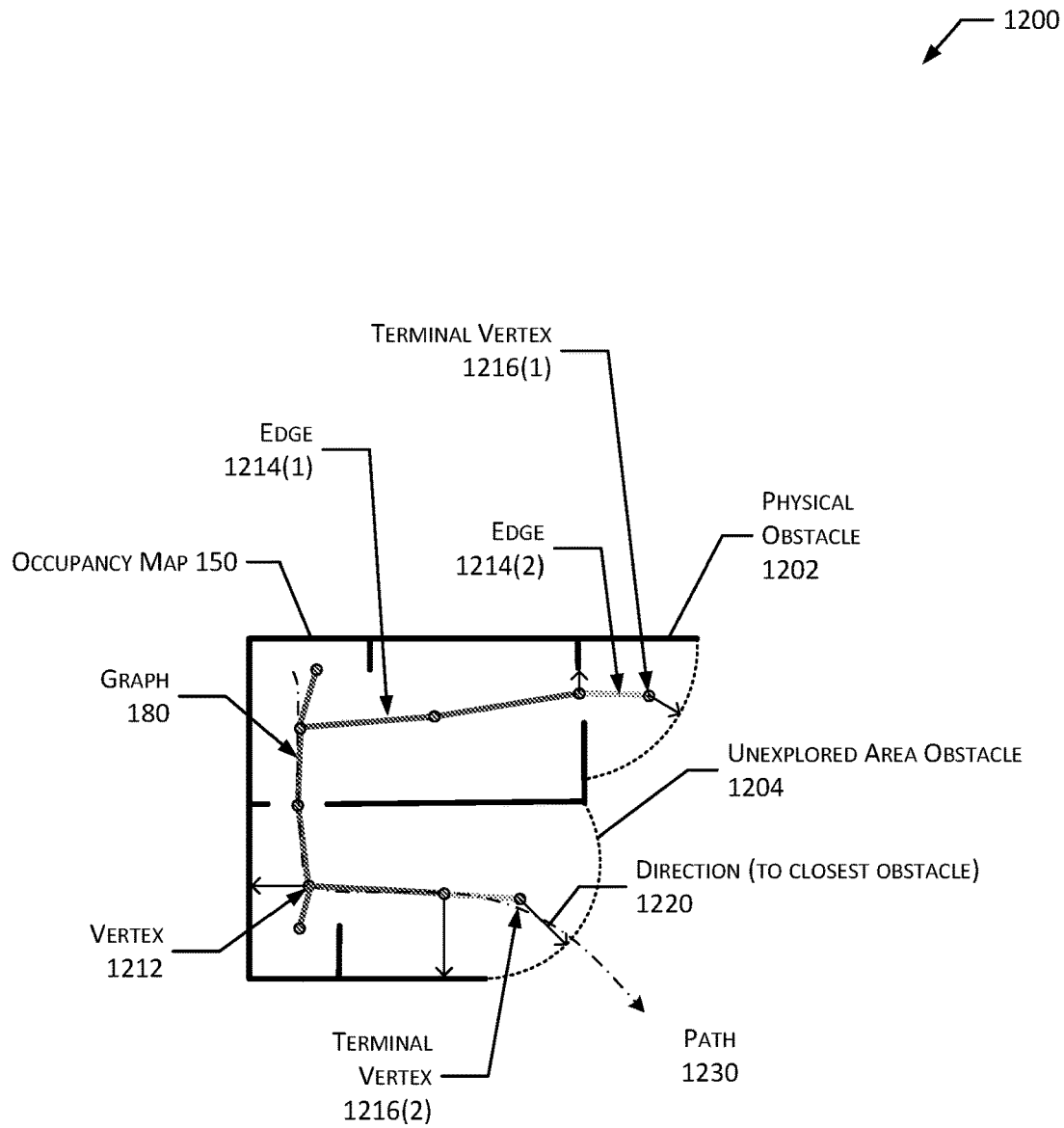
FIG. 12 depicts a graph that is generated using a distance transform vector function, according to some implementations.

FIG. 12 depicts at 1200 a graph 180 that is generated using a distance transform vector function of an occupancy map 150, according to some implementations. The occupancy map 150 is processed using a distance vector transform (DVT) function to determine the graph 180. One implementation of the DVT function used to determine the graph 180 is presented in the computer program listing filed with this disclosure. The distance vector transform function produces an array of data comprising distance transform values that are indicative of a minimum distance between a point of the graph 180, such as a set of coordinates of the occupancy map 150, and an obstacle 110 indicated by the occupancy map 150. Each point of the first graph 180 is a point that is equidistant from all closest obstacles that are indicated by the occupancy map 150. For example, the closest obstacles 110 are those that are within an unobstructed line of sight of the AMD 104, and not obstacles that are beyond a wall and in another room. The distance calculated may be Euclidean, rectilinear or "taxicab", Chebyshev distance, and so forth.

In some implementations the obstacles 110 considered by the DVT function may be limited to a value that is within a particular distance range. For example, the DVT function may disregard obstacles 110 that are greater than a maximum distance, disregard obstacles 110 that are closer than a minimum distance, and so forth. In some implementations, the range may be determined based on the characteristics of one or more sensors 126. For example, the minimum distance and the maximum distance may correspond to a minimum effective distance and a maximum effective distance of an optical time of flight sensor 320.

In addition to the distance to the closest obstacle 110 as indicated by the occupancy map 150, the DVT function also takes into consideration whether the obstacle 110 is a physical obstacle 1202 or an unexplored area obstacle 1204. A physical obstacle 1202 comprises something detected by one or more of the sensors 124. For example, a physical obstacle 1202 may be detected by an ultrasonic sensor 318, optical time of flight sensor 320, lidar 322, radar 360, and so forth. The unexplored area obstacle 1204 comprises an area in the physical space 102 for which sensor data 126 has not yet been acquired. The unexplored area itself may contain a physical obstacle 1202, or may be free of obstacles 110, but the occupancy map 150 does not yet include this data.

In one implementation, the array of data produced by the DVT function may comprise a grayscale bitmap. The array of data resulting from the distance transform function may be processed with one or more morphological operators to produce a morphological skeleton that is used as the graph 180. For example, the DVT function may produce as output a bitmap that is processed using one or more morphological operators, such as dilation and erosion to produce the morphological skeleton. The points on the morphological skeleton comprise points that are at a maximum distance from the obstacles 110, with the relative "color" or grayscale value indicating whether the closest obstacle 110 is a physical obstacle 1202 or an unexplored area.

The graph 180 may be visualized as a "skeleton" that overlays the occupancy map 150. The graph 180 may comprise a plurality of vertices 1212 that are joined to one another by edges 1214. A terminal vertex 1216 is a vertex 1212 that is at an endpoint of the graph 180. For example, a terminal vertex 1216 may comprise a vertex 1212 that is only connected to a single edge 1214.

The representation of the physical space 102 provided by the graph 180 and the associated data based on the characteristics of the closest obstacle 110 may be used to determine loop closure locations 148. The loop closure location selection module 144 may determine the loop closure location 148 based on weights of edges 1214 associated with a vertex 1212. Each edge 1214 may have a weight or a "strength" that is indicative of how many points within that edge 1214 are associated with physical obstacles 1202 or unexplored area obstacles 1204. For example, an edge 1214(1) having only points associated with physical obstacles 1202 would have a greater weight or "strength" than an edge 1214(2) that has some points associated with unexplored area obstacles 1204.

Vertexes 1212 that have a weight greater than a threshold value may be deemed suitable for use as loop closure locations 148. For example, the threshold value may be based on a proportion of the points in the edge 1214 that are associated with unexplored area obstacles 1204. Continuing the example, a first vertex 1212 associated with three edges 1214 that are based on points having closest obstacles of physical obstacles 1202 would have a greater weight than a second vertex having two edges 1214 based on points having closest obstacles of unexplored area obstacles 1204.

The DVT function may also determine data indicative of direction 1220. The data indicative of direction 1220 indicates a direction from the point to the closest obstacle 110. In some implementations the direction 1220 may be used to facilitate movement of the AMD 104. For example, if the direction 1220 indicates a direction towards an unexplored area obstacle 1204, the AMD 104 may proceed to explore by moving in the direction indicated by the direction data 1220.

In some implementations, locations coincident with points on the graph 180 may be used as loop closure locations 148. For example, points on the graph 180 represent locations that are farthest from obstacles 110. This provides space for the AMD 104 to move and reduces the likelihood that uncertainty 404 from the SLAM module 132 would result in the AMD 104 ending up in a location where it is unable to move.

The loop closure location 148 may be based on one or more of the information associated with the graph 180. The loop closure location 148 may be determined by one or more of a vertex 1212, a terminal vertex 1216, or a DVT weight associated with a point on the graph 180. As described above, a vertex 1212 associated with a greatest weight value may be selected for use as a loop closure location 148.

In some implementations, the path plan data 232 may be based at least in part on the graph 180. For example, the path plan data 232 may indicate a path 1230 that passes through or near one or more points on the graph 180. Continuing the example, the autonomous navigation module 164 may determine a first path 1230 from a first location to a second location in the physical space 102. The first path 1230 may pass within a threshold distance of a vertex 1212 that is designated as a loop closure point 148. A second path 1230 may be determined from the first location that passes through the vertex 1212 and then on to the second location. In this way, during movement, the AMD 104 may pass through or proximate to locations that facilitate the loop closure process.

Figure 13:
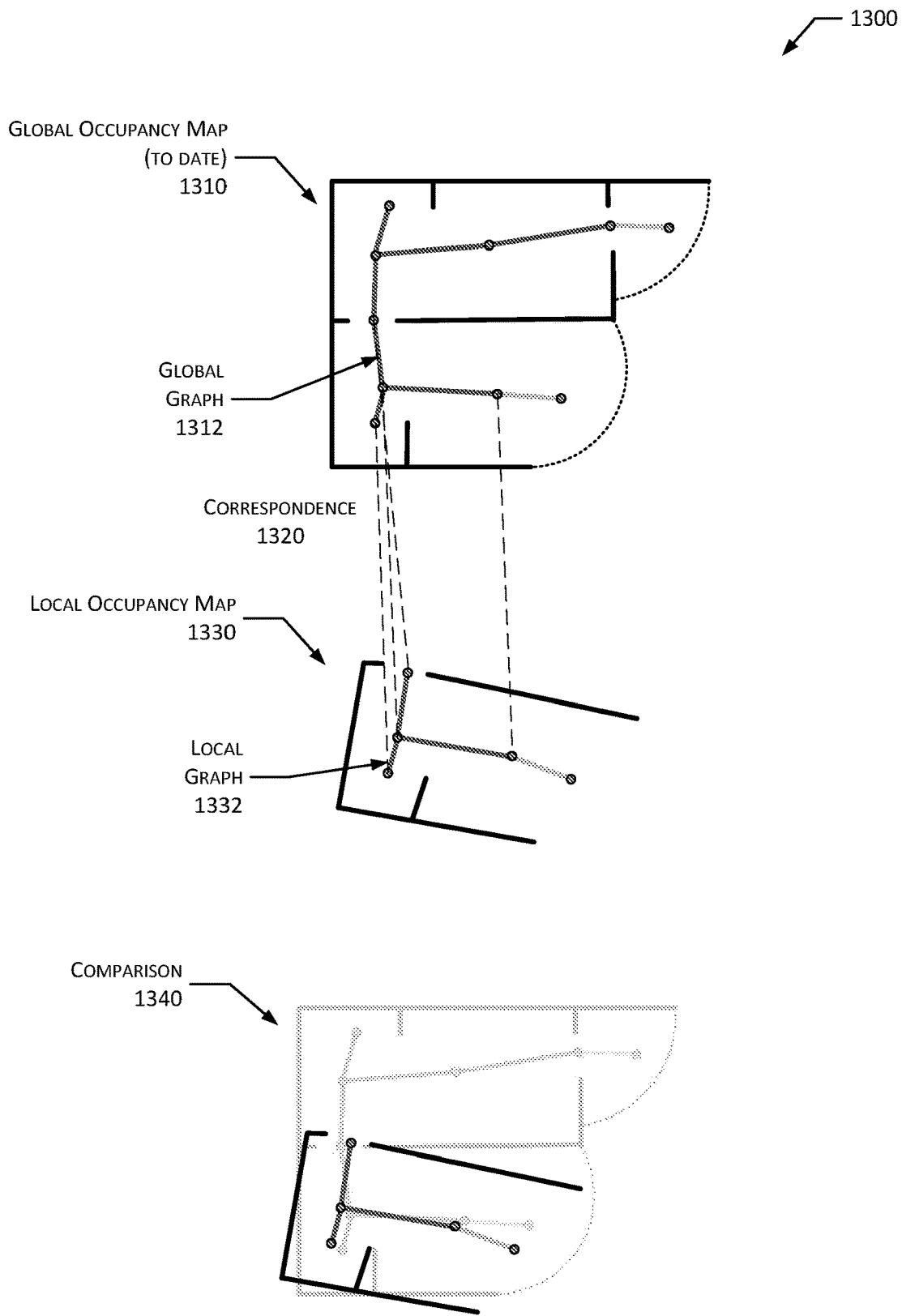
FIG. 13 depicts a global graph and a local graph generated using a distance transform vector function, and using the correspondence between the two to align a local occupancy map to a global occupancy map, according to some implementations.

FIG. 13 depicts a global graph and a local graph generated using the DVT function, and using the correspondence between the two to align a local occupancy map to a global occupancy map, according to some implementations.

A global occupancy map 1310 depicting the occupancy map 150 of the physical space 102 as determined to date is shown. The global occupancy map 1310 may be incomplete, in that there are unexplored areas.

A corresponding global graph 1312 has been determined based on the global occupancy map 1310. For example, the DVT function is used to determine the global graph 1312. The global graph 1312 may provide an invariant reference that may be subsequently used. The arrangement of particular vertices 1212 and edges 1214, or portions thereof, provides useful information about a location and orientation within the physical space 102 and may facilitate operation when the uncertainty 404 indicated by the uncertainty data 142 has exceeded a threshold value. For example, while the global graph 1312 may not be suitable to determine an absolute position and orientation, the global graph 1312 may be used to determine which direction the AMD 104 should move to successfully perform a loop closure process.

A local occupancy map 1330 is also shown. In some implementations, the AMD 104 may determine a local occupancy map 1330 based on sensor data 126 associated with a particular window of time or while at locations in the physical space 102 that are proximate to one another. For example, the local occupancy map 1330 may be based on data corresponding to a one meter square area within the sensor FOV 106.

As described above, as the AMD 104 moves, uncertainty accrues during operation of the SLAM module 132. A correspondence 1320 between the global graph 1312 and the local graph 1332 is shown. Due to the uncertainty introduced by the SLAM module 132, the local occupancy map 1330 and local graph 1332 are somewhat distorted relative to the global occupancy map 1310 and the global graph 1312. However, the correspondence between the local graph 1332 and a portion of the global graph 1312 is apparent. The relative configuration of the global graph 1312 is a relatively invariant representation of the physical space 102 that may be used to determine offset data indicative of an offset between the local occupancy map 1330 and the global occupancy map 1310, and so forth.

At 1340 a comparison of the graphs is depicted. The global graph 1312 and associated global occupancy map 1310 is shown along with the local graph 1332 and associated local occupancy map 1330. Offset data may be determined based on the correspondence 1320 between a portion of the local graph 1332 and the global graph 1312. In some implementations, the comparison may be limited to portions of the respective graphs that are associated with physical obstacles 1202. In one implementation, the offset data may comprise a transform matrix that indicates one or more of rotation, translation, warp, or other factors that would align the local graph 1332 and corresponding local occupancy map 1330 to the global graph 1312 and the corresponding global occupancy map 1310.

This offset data may be used to facilitate loop closure by providing improved guidance of the AMD 104 to a loop closure location 148. For example, the uncertainty data 142 from the SLAM module 132 indicates that the uncertainty 404 is greater than the threshold value. As a result, the current pose data 134 is uncertain, and the AMD 104 does not know where exactly it is. However, to perform a loop closure process the AMD 104 will need to move to, or near, a previously visited location for which feature data 136 is available. The AMD 104 could move randomly or initiate a search pattern, but this consumes time and resources while limiting the AMD 104 to perform other tasks. By using the offset data, the AMD 104 is able to determine which direction to move towards, even if the pose data 134 is uncertain. For example, the AMD 104 is directed to move towards a first vertex 1212 of the global graph 1312 to perform loop closure. The offset data indicates that the local graph 1332 is rotated by +5 degrees relative to a first axis of the global occupancy map 1310, with an offset of +5 centimeters along the first axis and −2 cm along a second axis of the global occupancy map 1310. The path 1230 towards the first vertex 1212 may be adjusted based on the offset data, allowing the AMD 104 to reach the first vertex 1212 with less delay.

In addition to, or instead of, the use of the uncertainty data 142 to initiate a loop closure process, the loop closure process may be initiated responsive to other determinations. For example, if one or more values of the offset data exceed a threshold value, the loop closure process may be initiated. In another example, the local occupancy map 1330 may be compared to the global occupancy map 1310. Continuing the example, if the differences between the local occupancy map 1330 and the global occupancy map 1310 exceed a threshold value, the loop closure process may be initiated.

Figure 14:
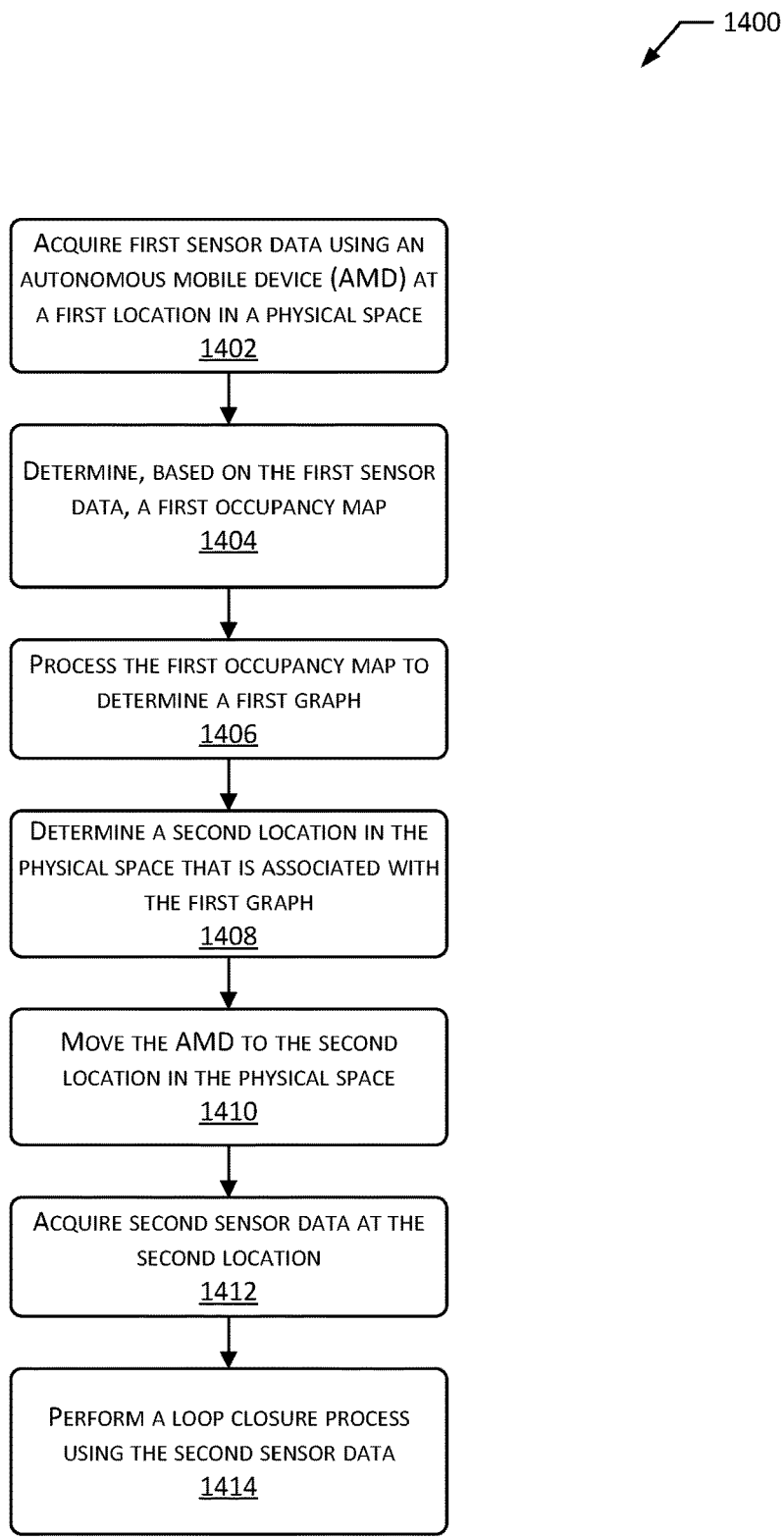
FIG. 14 is a flow diagram of a process for determining a graph that may be used to determine a loop closure location, according to some implementations.

FIG. 14 is a flow diagram 1400 of a process for determining a graph 180 that may be used to determine a loop closure location 148, according to some implementations. The process may be implemented at least in part by one or more of the AMD 104, the docking station 108, a server 170, or other device 176.

At 1402, first sensor data 126(1) is acquired by the AMD 104 at a first location in a physical space 102. For example, the AMD 104 may use one or more sensors 124 to acquire sensor data 126. The AMD 104 may have moved to the first location autonomously. For example, during exploration the autonomous navigation module 164 may direct the AMD 104 through the physical space 102.

At 1404, based on the first sensor data 126(1), a first occupancy map 150 is determined. The first occupancy map 150 may be indicative of one or more of physical obstacles 1202 or unexplored area obstacles 1204.

At 1406, based on the first occupancy map 150, a first graph 180 is determined. For example, the first occupancy map 150 may be processed using the distance vector transform (DVT) function. For example, the first graph 180 is indicative of locations in the physical space 102, wherein each point of the first graph 180 corresponds to a location in the physical space 102 that is equidistant from all closest obstacles 110 that are indicated by the first occupancy map 150, and each point in the first graph 180 is associated with first data indicative of whether the closest obstacle 110 is an unexplored area obstacle 1204 or a physical obstacle 1202 as indicated by the first occupancy map 150.

At 1408, a second location in the physical space 102 that is associated with the first graph 180 is determined. For example, a first vertex 1212 may be selected from a plurality of vertices 1212 of the graph 180, based on one or more of a weight associated with the vertex 1212, an expected direction of travel of the AMD 104, and so forth.

For example, the first graph 180 may comprise a first vertex 1212, a second vertex 1212, and a third vertex 1212. A first edge 1214 comprising a first plurality of points that represent locations between the first vertex 1212 and the second vertex 1212. Each of the first plurality of points are associated with the first data indicative of the closest obstacle 110 being a physical obstacle 1202 as indicated by the first occupancy map 150. A second edge 1214 comprising a second plurality of locations is between the second vertex 1212 and the third vertex 1212. At least one of the second plurality of locations is associated with the first data indicative of the closest obstacle 110 being an unexplored area obstacle 1204 as indicated by the first occupancy map 150. As a result, the first edge 1214 has a greater "strength" or weight value than the second edge 1214. The AMD 104 may move to the location associated with the first edge 1214 and perform a loop closure process.

In some implementations, a weight of a junction may be determined and used to determine a loop closure location 148. For example, the first graph 180 may comprise a first vertex 1212 that is associated with a first location in the physical space 102. A first metric value may be determined that is associated with the first vertex 1212. The first metric value may be based on one or more of: a first count of a first set of edges 1214 that intersect the first vertex 1212. Each edge 1214 in the first set of edges 1214 has a second metric value greater than a threshold value. For example, the first set of edges 1214 may comprise edges 1214 that are associated with physical obstacles 1202. A second count of a second set of edges 1214 that intersect the first vertex 1212 is also determined. Each edge 1214 in the second set of edges 1214 has a second metric value less than or equal to the threshold value. For example, the second set of edges 1214 may comprise edges 1214 that are associated with one or more unexplored area obstacles 1204. The first metric value may also be based on a first distance between the first location and a closest obstacle 110 to the first location. In one implementation, the first metric value may be based on whether the first distance is within a threshold range. For example, the threshold range may specify a minimum distance and a maximum distance. In this implementation, it may be advantageous to specify a minimum distance based on the performance of one or more sensors 124 and a maximum distance that is still within range of the sensors 124. The first metric value associated with the first vertex 1212 may also be based on the first data that indicates whether the closest obstacle 110 to the first vertex 1212 or one or more points in the edges 1214 is a physical obstacle 1202 or an unexplored area obstacle 1204 obstacle. Based on the first metric value, the first vertex 1212 may be selected. The AMD 104 may then move to the location associated with the first vertex 1212.

At 1410 the AMD 104 moves to the second location in the physical space 102. For example, the autonomous navigation module 164 may direct the AMD 104 through the physical space 102. The path used by the AMD 104 to move to the second location may be based on, or coincident with, the graph 180. For example, the points associated with the path of the AMD 104 may be coincident with one or more points of the graph 180. In some implementations, the graph 180 may be used to select loop closure locations 148 that are along a planned path 1230. For example, path plan data 232 may be determined that is indicative of a path 1230 in the physical space 102 from a third location to a fourth location. A fifth location that is associated with the first graph 180 is determined to be proximate to a portion of the path 1230. For example, a vertex 1212 with a minimum weight value may be within a threshold distance of the path 1230. The fifth location may be added to the path plan data 232. The AMD 104 may then move based on the path plan data 232. As a result, the AMD 104 may pass through or near a loop closure location 148, and the loop closure process may be performed.

At 1412 second sensor data 126(2) is acquired by the AMD 104 at a second location in the physical space 102.

At 1414 the loop closure process is performed using the second sensor data 126(2). For example, the first sensor data 126(1) and the second sensor data 126(1) may be used to perform the loop closure process. In some situations the loop closure process may be unable to complete or otherwise fail. In this situation, the AMD 104 may move to another physical location that corresponds to another point of the graph 180. For example, if the loop closure process is unable to complete at a first vertex 1212, the AMD 104 may move to a second vertex 1212 and attempt the loop closure process.

In some implementations, the first graph 180 may be used to facilitate other actions. For example, the AMD 104 may use the first graph 180 to explore the physical space 102. While exploring, the AMD 104 may move towards weak vertexes 1212 or edges 1214.

For example, the first graph 180 may comprise a first vertex 1212, a second vertex 1212, and a third vertex 1212. A first edge 1214 comprising a first plurality of locations is between the first vertex 1212 and the second vertex 1212. Each of the first plurality of locations are associated with the first data indicative of the closest obstacle 110 being a physical obstacle 1202 as indicated by the first occupancy map 150. A second edge 1214 comprising a second plurality of locations is between the second vertex 1212 and the third vertex 1212. At least one of the second plurality of locations are associated with the first data indicative of the closest obstacle being an unexplored area obstacle 1204 as indicated by the first occupancy map 150. As a result, the second edge 1214 has a lesser "strength" or weight value than the first edge 1214. The AMD 104 may move towards the terminal vertex 1216 associated with the second edge 1214 and gather sensor data 126 to explore.

As described with regard to FIG. 13, the DVT function may be used to align a local occupancy map 1330 to a global occupancy map 1310. This may facilitate loop closure, localization of the AMD 104 in the physical space 102, and so forth.

Continuing the earlier example, the first sensor data 126(1) may be acquired at a first time and the first occupancy map 150 is associated with a first area of the physical space 102. For example, the first occupancy map 150 may comprise the global occupancy map 1310.

At a second physical location, second sensor data 126(2) is acquired for a portion of the physical space 102 at a second time after the first time. Based at least in part on the second sensor data 126(2), a second occupancy map 150 is determined that is indicative of locations of one or more obstacles 110 in the portion of the physical space 102. For example, the second occupancy map 150 may comprise a local occupancy map 1330 that is indicative of whether each obstacle 110 is a physical obstacle 1202 or an unexplored area obstacle 1204.

The second occupancy map 150 is processed with the DVT function to determine a second graph 180 indicative of locations in the portion of the physical space 102. Each point of the second graph 180 corresponds to a location in the physical space 102 that is equidistant from all closest obstacles 110 that are indicated by the second occupancy map 150. Each point of the second graph 180 is also associated with second data indicative of whether the closest obstacle 110 is an unexplored area obstacle 1204 or a physical obstacle 1202 as indicated by the second occupancy map 150. For example, the second graph 180 may comprise the local occupancy map 1330.

Metrics may be calculated for one or more of vertices 1212 or edges 1214 of the graphs 180 and compared to determine a correspondence. For example, a first metric value is determined that is associated with a first vertex 1212 of the second graph 180. A second metric value is determined that is associated with a second vertex 1212 of the second graph 180. In this example, the second metric value is greater than the first metric value. This indicates that the second metric value has a greater "strength" resulting from being associated with physical obstacles 1202.

A correspondence is determined between the second vertex 1212 of the second graph 180 and third vertex 1212 of the first graph 180. For example, the relative configuration between the graphs 180 may be compared based on one or more of angles between edges 1214, distances between vertices 1212, and so forth.

Based on the correspondence, offset data is determined that is indicative of one or more of translation or rotation of the second occupancy map 150 with respect to the first occupancy map 150. This offset data may then be used in one or more ways. For example, the offset data may be used to align the second occupancy map 150 to the first occupancy map 150. In another example, the offset data may be used to correct for the misalignment and assist it directing the movement of the AMD 104. Continuing the example, the AMD 104 may use the offset data to try and move to a loop closure location 148, correcting for the determined misalignment and allowing the AMD 104 to more quickly reach the loop closure location 148.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
   one or more sensors;
   one or more memories storing computer-executable instructions; and
   one or more processors to execute the computer-executable instructions to:
      acquire, using the one or more sensors, first sensor data at a first location in a physical space;
      determine, based at least in part on the first sensor data, a first occupancy map indicative of locations of one or more physical obstacles or one or more unexplored areas;
      process the first occupancy map with a distance vector transform function to determine a first graph, the first graph comprising:
         a first vertex,
         a second vertex,
         a third vertex,
         a first edge comprising a first plurality of points between the first vertex and the second vertex, wherein each of the first plurality of points corresponds to a second location in the physical space, wherein the second location is associated with first data indicating a physical obstacle is within a certain distance of the second location, and
         a second edge comprising a second plurality of points between the second vertex and the third vertex, wherein a first point of the second plurality of points corresponds to a third location in the physical space, wherein the third location is associated with the first data indicating an unexplored area is within a certain distance of the third location;
      move the AMD to a fourth location in the physical space that corresponds to one of the first plurality of points;
      acquire second sensor data at the fourth location; and
      perform a loop closure process using the second sensor data.

2. The AMD of claim 1, the one or more processors to further execute the computer-executable instructions to:
   determine the loop closure process in unable to complete;
   move the AMD to a fifth location in the physical space that corresponds to a point on the first graph;
   acquire third sensor data at the fifth location; and
   perform a second loop closure process using the third sensor data.

3. The AMD of claim 1, wherein:
   a first weight value associated with the first edge is greater than a second weight value associated with the second edge.

4. The AMD of claim 1, the one or more processors to further execute the computer-executable instructions to:
   determine a second occupancy map based at least in part on the second sensor data and the first occupancy map.

5. The AMD of claim 1, wherein the first vertex is associated with a fifth location in the physical space; and the one or more processors to further execute the computer-executable instructions to:
   determine a first metric value associated with the first vertex, wherein the first metric value is based on one or more of:
      a first count of a first set of edges that intersect the first vertex, wherein each edge in the first set of edges has a second metric value greater than a threshold value,
      a second count of a second set of edges that intersect the first vertex, wherein each edge in the second set of edges has a third metric value less than or equal to the threshold value,
      a first distance between the fifth location and a physical obstacle or unexplored area, or
      the first data;
   select, based on the first metric value, the first vertex; and
   move the AMD to the fifth location.

6. The AMD of claim 1, the one or more processors to further execute the computer-executable instructions to:
   determine path plan data indicative of a path in the physical space from a fifth location in the physical space to a sixth location in the physical space;
   determine a first point of the first graph that corresponds to a seventh location in the physical space that is proximate to a portion of the path;
   add the seventh location to the path plan data; and
   move the AMD based on the path plan data.

7. The AMD of claim 1, wherein the first sensor data is acquired at a first time and the first occupancy map is associated with a first area of the physical space; and
   the one or more processors to further execute the computer-executable instructions to:
   acquire, using the AMD at a fifth location in the physical space, third sensor data at a second time after the first time;
   determine, based at least in part on the third sensor data, a second occupancy map indicative of one or more second physical obstacles or one or more second unexplored areas;
   process the second occupancy map with the distance vector transform function to determine a second graph comprising points that correspond to locations in a second area, wherein:
      each point in the second graph is based on distances from one or more of:
         at least one of the one or more second physical obstacles that are within a line of sight of the AMD, or
         at least one of the one or more second unexplored areas that are within a line of sight of the AMD; and
      each point in the second graph corresponds to a sixth location, wherein the sixth location is associated with second data indicating whether a second unexplored area or a second physical obstacle is within a certain distance of the sixth location;
   determine a first metric value associated with a fourth vertex of the second graph;
   determine a second metric value associated with a fifth vertex of the second graph, wherein the second metric value is greater than the first metric value;

determine a correspondence between the fifth vertex of the second graph and a sixth vertex of the first graph; and determine, based on the correspondence, offset data indicative of one or more of translation or rotation of the second occupancy map with respect to the first occupancy map.

8. The AMD of claim 7, wherein the first graph comprises a seventh vertex that is associated with a seventh location in the physical space; and the one or more processors to further execute the computer-executable instructions to:

determine a third metric value associated with the seventh vertex, wherein the third metric value is based on one or more of:
- a first count of a first set of edges that intersect the seventh vertex, wherein each edge in the first set of edges has a fourth metric value greater than a threshold value,
- a second count of a second set of edges that intersect the seventh vertex, wherein each edge in the second set of edges has a fifth metric value less than or equal to the threshold value,
- a first distance between the seventh location and a physical obstacle or unexplored area, or
- the first data;

select, based on the third metric value, the seventh vertex; move the AMD to the seventh location;
acquire fourth sensor data at or proximate to the seventh location; and
perform a loop closure process using the fourth sensor data.

9. A method comprising:
acquiring, using an autonomous mobile device (AMD), first sensor data in a physical space;
determining, based at least in part on the first sensor data, a first occupancy map indicative of locations of one or more physical obstacles or one or more unexplored areas;
processing the first occupancy map with a distance vector transform function to determine a first graph comprising points that correspond to locations in the physical space, wherein:
each point in the first graph is based on distances from one or more of:
- at least one of the one or more physical obstacles that are within a line of sight of the AMD, or
- at least one of the one or more unexplored areas that are within the line of sight of the AMD; and each point in the first graph is associated with first data indicative of whether a location in the physical space is associated with an unexplored area or a physical obstacle;
wherein the first graph further comprises:
a first vertex,
a second vertex,
a third vertex,
a first edge comprising a first plurality of points between the first vertex and the second vertex, wherein:
each of the first plurality of points corresponds to a first location in the physical space, wherein the first location is associated with the first data indicating a physical obstacle is within a certain distance of the first location, and a second edge comprising a second plurality of points between the second vertex and the third vertex, wherein:
a first point of the second plurality of points corresponds to a second location in the physical space, wherein the second location is associated with the first data indicating an unexplored area is within a certain distance of the second location;

moving the AMD to a third location in the physical space that is associated with the first point;
acquiring second sensor data at the third location; and
determining a second occupancy map based at least in part on the second sensor data and the first occupancy map.

10. The method of claim 9, further comprising:
performing a loop closure process using the second sensor data.

11. The method of claim 9, further comprising:
performing a first loop closure process using the second sensor data;
determining the first loop closure process in unable to complete;
moving the AMD to a fourth location in the physical space that corresponds to a second point on the first graph;
acquiring third sensor data at the fourth location; and
performing a second loop closure process using the third sensor data.

12. The method of claim 9, wherein:
a first weight value associated with the first edge is less than a second weight value associated with the second edge.

13. The method of claim 9, wherein the first vertex is associated with a fourth location in the physical space; the method further comprising:
determining a first metric value associated with the first vertex, wherein the first metric value is based on one or more of:
- a first count of a first set of edges that intersect the first vertex, wherein each edge in the first set of edges has a second metric value greater than a threshold value,
- a second count of a second set of edges that intersect the first vertex, wherein each edge in the second set of edges has a third metric value less than or equal to the threshold value,
- a first distance between the fourth location and a physical obstacle or unexplored area, or
- the first data;

selecting, based on the first metric value, the first vertex; and
moving the AMD to the fourth location.

14. The method of claim 9, further comprising:
determining path plan data indicative of a path in the physical space from a fourth location in the physical space to a fifth location in the physical space;
determining a second point of the first graph that corresponds to a sixth location in the physical space that is proximate to a portion of the path;
adding the sixth location to the path plan data; and
moving the AMD based on the path plan data.

15. The method of claim 9, wherein the first sensor data is acquired:
at a first time,
at a fourth location in the physical space, and
the first occupancy map is associated with a first area of the physical space; and the method further comprising:
acquiring, using the AMD at a second time after the first time and at a fifth location in the physical space, third sensor data about a second area of the physical space;
determining, based at least in part on the third sensor data, a second occupancy map indicative of locations of one or more second physical obstacles or one or more second unexplored areas;
processing the second occupancy map with the distance vector transform function to determine a second graph comprising points that correspond to locations in the second area of the physical space, wherein:
each point in the second graph is based on distances from one or more of:
at least one of the one or more second physical obstacles that are within a second line of sight of the AMD, or
at least one of the one or more second unexplored areas that are within the second line of sight of the AMD; and
each point in the second graph corresponds to a sixth location in the physical space, wherein the sixth location is associated with second data of indicating whether a second unexplored area or a second physical obstacle is within a certain distance of the sixth location;
determining a first metric value associated with a fourth vertex of the second graph;
determining a second metric value associated with a fifth vertex of the second graph, wherein the second metric value is greater than the first metric value;
determining a correspondence between the fifth vertex of the second graph and a sixth vertex of the first graph; and
determining, based on the correspondence, offset data indicative of one or more of translation or rotation of the second occupancy map with respect to the first occupancy map.

16. The method of claim 15, wherein the first graph comprises a seventh vertex that is associated with a seventh location in the physical space; and
the method further comprising:
determining a third metric value associated with the seventh vertex, wherein the third metric value is based on one or more of:
a first count of a first set of edges that intersect the sixth vertex, wherein each edge in the first set of edges has a fourth metric value greater than a threshold value,
a second count of a second set of edges that intersect the sixth vertex, wherein each edge in the second set of edges has a fifth metric value less than or equal to the threshold value,
a first distance between the seventh location and a physical obstacle or unexplored area, or
the first data;
selecting, based on the third metric value, the seventh vertex;
moving the AMD to the seventh location;
acquiring fourth sensor data at or proximate to the seventh location; and
performing a loop closure process using the fourth sensor data.

17. A method comprising:
acquiring first sensor data at a first location in a physical space;
determining, based at least in part on the first sensor data, a first occupancy map indicative of locations of one or more physical obstacles or one or more unexplored areas;
determining a first graph comprising points that correspond to locations in the physical space, wherein:
each point in the first graph is based on distances from one or more of:
at least one of the one or more physical obstacles that are within a line of sight of an autonomous mobile device (AMD), or
at least one of the one or more unexplored areas that are within the line of sight of the AMD;
wherein each point in the first graph is associated with first data indicative of whether a location in the physical space is associated with an unexplored area or a physical obstacle; and
wherein the first graph comprises:
a first vertex,
a second vertex,
a third vertex,
a first edge comprising a first plurality of points between the first vertex and the second vertex, wherein each of the first plurality of points corresponds to a second location in the physical space, wherein the second location is associated with the first data indicating a physical obstacle is within a certain distance of the second location, and
a second edge comprising a second plurality of points between the second vertex and the third vertex, wherein a first point of the second plurality of points corresponds to a third location in the physical space, wherein the third location is associated with the first data indicating an unexplored area is within a certain distance of the third location;
moving the AMD to a fourth location in the physical space that is associated with the first point;
acquiring second sensor data at the fourth location; and
determining a second occupancy map based at least in part on the second sensor data and the first occupancy map.

18. The method of claim 17, further comprising:
determining a loop closure location based at least on the first graph.

19. The method of claim 17, further comprising:
determining path plan data indicative of a path in the physical space from a fifth location in the physical space to a sixth location in the physical space;
determining a first point of the first graph that corresponds to the sixth location in the physical space that is proximate to a portion of the path;
adding the sixth location to the path plan data; and
moving the AMD based on the path plan data.

20. The method of claim 17, wherein the first sensor data is acquired at a first time and the first occupancy map is associated with a first area of the physical space; and
the method further comprising:
acquiring, at a fifth location in the physical space and at a second time after the first time, third sensor data of the first area of the physical space;
determining, based at least in part on the third sensor data, a second occupancy map indicative of locations of one or more second physical obstacles or one or more second unexplored areas;

processing the second occupancy map to determine a second graph comprising points that correspond to locations in the physical space, wherein:
- each point in the second graph is based on distances from one or more of at least one of the one or more second physical obstacles that are within a second line of sight of the AMD or at least one or more of the one or more second unexplored areas that are within the second line of sight of the AMD; and
- each point in the second graph corresponds to a sixth location, wherein the sixth location is associated with second data indicating whether a second unexplored area or a second physical obstacle is within a certain distance of the sixth location;

determining a correspondence between a portion of the second graph and a portion of the first graph;

moving the AMD to a seventh location in the physical space that is associated with a second point of the first graph;

acquiring fourth sensor data at or proximate to the seventh location; and performing a loop closure process using the fourth sensor data.

* * * * *

UNITED STATES PATENT AND TRADEMARK OFFICE
CERTIFICATE OF CORRECTION

| | | |
|---|---|---|
| PATENT NO. | : 11,720,117 B1 | |
| APPLICATION NO. | : 17/082988 | |
| DATED | : August 8, 2023 | |
| INVENTOR(S) | : Chang Young Kim et al. | |

It is certified that error appears in the above-identified patent and that said Letters Patent is hereby corrected as shown below:

On the Title Page

"Item (56) References Cited" please add:
--20190051198 Nimmagadda et al.--.

In the Claims

Column 53, Claim 15, Line 24:
Currently reads: "location is associated with second data of indicating"
Where it should read --location is associated with second data indicating--.

Signed and Sealed this
Seventeenth Day of October, 2023

Katherine Kelly Vidal
*Director of the United States Patent and Trademark Office*